(12) United States Patent
Ishibashi et al.

(10) Patent No.: US 12,185,017 B2
(45) Date of Patent: Dec. 31, 2024

(54) DISPLAY CONTROL APPARATUS, VEHICLE, AND DISPLAY CONTROL METHOD

(71) Applicant: Panasonic Intellectual Property Management Co., Ltd., Osaka (JP)

(72) Inventors: Yudai Ishibashi, Kanagawa (JP); Yoshimasa Okabe, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 87 days.

(21) Appl. No.: 18/112,892

(22) Filed: Feb. 22, 2023

(65) Prior Publication Data
US 2023/0199137 A1    Jun. 22, 2023

Related U.S. Application Data

(63) Continuation of application No. PCT/JP2021/006345, filed on Feb. 19, 2021.

(30) Foreign Application Priority Data

Aug. 31, 2020  (JP) .................................. 2020-145674

(51) Int. Cl.
*H04N 5/265* (2006.01)
*B60R 1/26* (2022.01)
*G06T 11/00* (2006.01)
*G06V 20/58* (2022.01)
(Continued)

(52) U.S. Cl.
CPC .............. *H04N 5/265* (2013.01); *B60R 1/26* (2022.01); *G06T 11/00* (2013.01); *G06V 20/58* (2022.01); *H04N 5/2628* (2013.01); *H04N 23/90* (2023.01); *B60R 2300/105* (2013.01); *B60R 2300/20* (2013.01); *B60R 2300/303* (2013.01);
(Continued)

(58) Field of Classification Search
CPC ...... H04N 23/90; H04N 5/265; H04N 5/2628; G06V 20/58; G06V 2201/08; B60R 1/26; B60R 2300/105; B60R 2300/303; B60R 2300/20; G06T 11/00; G06T 2207/30252; G06T 2207/20221
USPC ................................ 348/148, 143, 153, 159
See application file for complete search history.

(56) References Cited

U.S. PATENT DOCUMENTS

2023/0103678 A1*  4/2023  Yuda ......................... G06T 7/00
                                                            348/148

FOREIGN PATENT DOCUMENTS

JP         2020-052671         4/2020

OTHER PUBLICATIONS

English language translation of Office Action from Japan Patent Office (JPO) in Japanese Patent Appl. No. 2020-145674, dated Mar. 5, 2024.

(Continued)

*Primary Examiner* — Sherrie Hsia
(74) *Attorney, Agent, or Firm* — Greenblum & Bernstein, P.L.C

(57) ABSTRACT

A display control apparatus includes a vehicle detector and a processor, the processor generating a background image of a vehicle, setting, when a surrounding vehicle is detected in a predetermined region, a second projection plane to a position at which the surrounding vehicle is detected, generating a surrounding vehicle image by projecting a plurality of captured images onto the second projection plane, and superimposing the surrounding vehicle image on the background image.

18 Claims, 22 Drawing Sheets

(51) Int. Cl.
*H04N 5/262* (2006.01)
*H04N 23/90* (2023.01)
(52) U.S. Cl.
CPC ............... *G06T 2207/20221* (2013.01); *G06T 2207/30252* (2013.01); *G06V 2201/08* (2022.01)

(56) References Cited

OTHER PUBLICATIONS

International Search Report (ISR) from International Searching Authority (Japan Patent Office) in International Pat. Appl. No. PCT/JP2021/006345, dated Apr. 13, 2021, together with an English language translation.

* cited by examiner

RIGHT IMAGE → RIGHT VIRTUAL VISUAL POINT IMAGE  
REAR IMAGE → REAR VIRTUAL VISUAL POINT IMAGE  } COMBINATION → DISPLAY IMAGE  
LEFT IMAGE → LEFT VIRTUAL VISUAL POINT IMAGE

FIG. 6

DISPLAY CONTROL APPARATUS, VEHICLE, AND DISPLAY CONTROL METHOD

TECHNICAL FIELD

The present disclosure relates to a display control apparatus, a vehicle, and a display control method.

BACKGROUND ART

Japanese Patent Application Laid Open No. 2020-052671 discloses a display control apparatus that combines images captured by cameras respectively installed on right, left, and rear sides and then displays the resultant image on a display apparatus. The conventional art of this type sets a projection plane to a position of a following vehicle and sets a boundary of a visual field of each of the cameras to match the position of the following vehicle, thereby avoiding double-imaging of the following vehicle.

CITATION LIST

Patent Literature

PTL 1
Japanese Patent Application Laid Open No. 2020-052671

SUMMARY OF INVENTION

Solution to Problem

A display control apparatus according to an exemplary embodiment of the present disclosure includes: a vehicle detector that detects a surrounding vehicle present around a vehicle, based on a plurality of captured images around the vehicle captured by a plurality of imaging devices mounted to the vehicle; and an image processor that generates a display image to be displayed on a display mounted to the vehicle, by combining the plurality of captured images, in which the image processor generates a background image of the vehicle by projecting the plurality of captured images onto a first projection plane set behind the vehicle, sets, when the surrounding vehicle is detected in a predetermined region, a second projection plane to a position at which the surrounding vehicle is detected, generates a surrounding vehicle image that is an image of the surrounding vehicle, by projecting at least one of the plurality of captured images onto the second projection plane, and superimposes the surrounding vehicle image on the background image.

A vehicle according to an exemplary embodiment of the present disclosure includes the above-described display control apparatus.

A display control method according to an exemplary embodiment of the present disclosure includes: detecting a surrounding vehicle present around a vehicle, based on a plurality of captured images around the vehicle captured by a plurality of imaging devices mounted to the vehicle; generating a background image of the vehicle by projecting the plurality of captured images onto a first projection plane set behind the vehicle; setting, when the surrounding vehicle is detected in a predetermined region, a second projection plane to a position at which the surrounding vehicle is detected; generating a surrounding vehicle image that is an image of the surrounding vehicle, by projecting at least one of the plurality of captured images onto the second projection plane; and superimposing the surrounding vehicle image on the background image.

Advantageous Effects of Invention

According to an exemplary embodiment of the present disclosure, a display control apparatus, a vehicle, and a display control method can be built each capable of preventing a following vehicle from disappearing from a combined image.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 6 is a diagram for describing a flow of generating a display image by combining images captured by three cameras;

DESCRIPTION OF EMBODIMENTS

Figure 1:
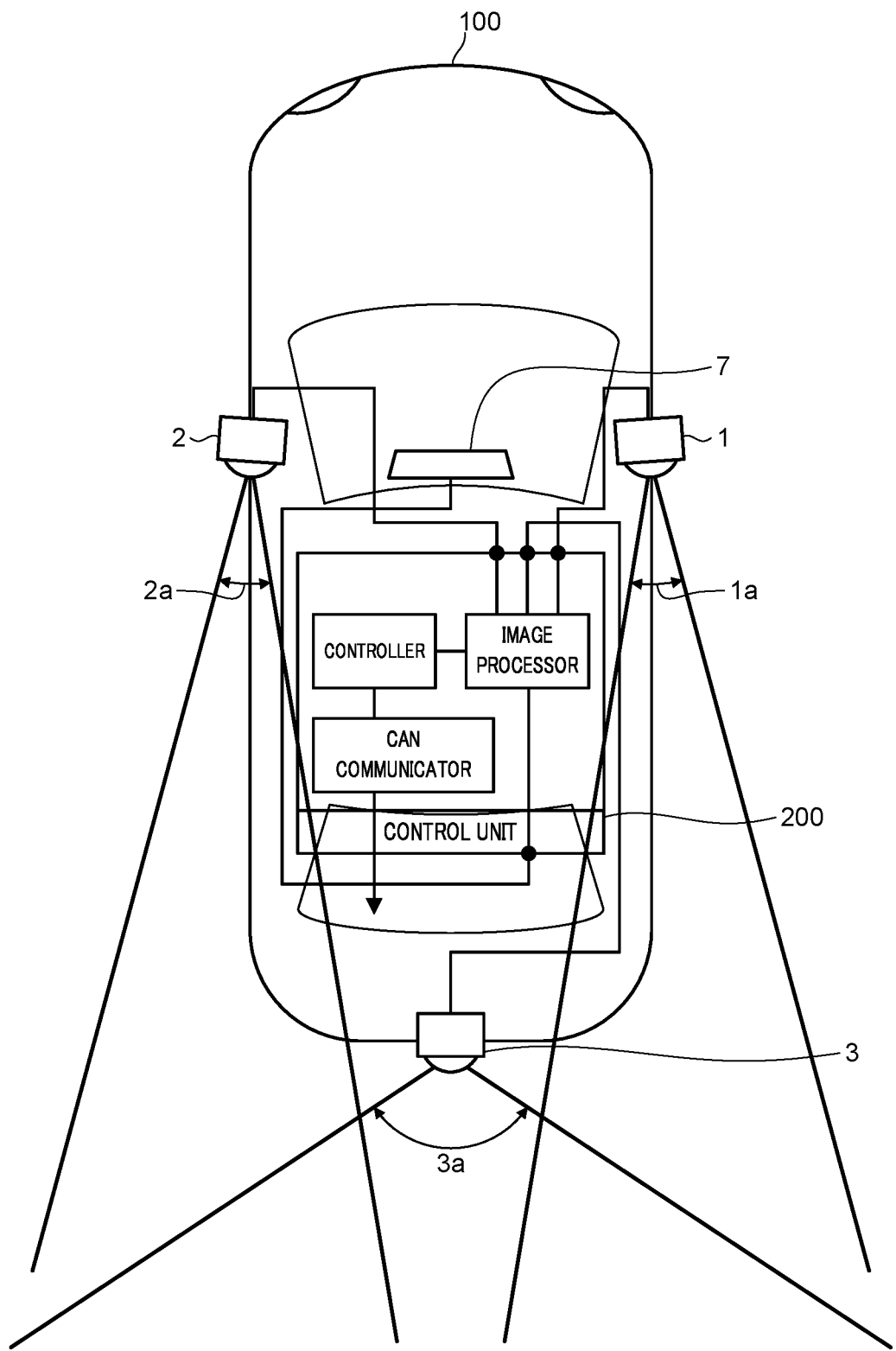
FIG. 1 illustrates an exemplary configuration of vehicle 100 according to an embodiment of the present disclosure.

Preferred embodiments of the present disclosure will be described in detail with reference to the attached drawings. Note that elements having substantially the same functions are assigned the same reference numerals in the description and drawings to omit duplicated descriptions thereof.

Embodiment

FIG. 1 illustrates an exemplary configuration of vehicle 100 according to the embodiment of the present disclosure. Vehicle 100 includes right camera 1, left camera 2, rear camera 3, and display control apparatus 200.

Each of right camera 1, left camera 2, and rear camera 3 is an imager that includes an imaging sensor such as a Charge Coupled Device (CCD) or a Complementary Metal Oxide Semiconductor (CMOS) and images the outside of vehicle 100.

Right camera 1 is installed on a right side with respect to a traveling direction of vehicle 100, for example, is usually provided, at a position of a right side mirror, right obliquely rearward and slightly downward, and inputs image information indicating a content of a captured image of visual-field range 1a (right image) to display control apparatus 200. Visual-field range 1a is a certain region on a right rear side (right obliquely rearward) of vehicle 100.

Left camera 2 is installed on a left side with respect to a traveling direction of vehicle 100, for example, is usually provided, at a position of a left side minor, left obliquely rearward and slightly downward, and inputs image information indicating a content of a captured image of visual-field range 2a (left image) to display control apparatus 200. Visual-field range 2a is a certain region on a left rear side (left obliquely rearward) of vehicle 100.

Rear camera 3 is provided slightly downward on a rear side with respect to a traveling direction of vehicle 100, for example, and inputs image information indicating a content of a captured image of visual-field range 3a (image behind vehicle (hereinafter may also be referred to as "rear image")) to display control apparatus 200. Visual-field range 3a is a certain region behind vehicle 100.

Display control apparatus 200 is an apparatus that displays images cropped from the right image, the left image, and the rear image, respectively, on display 7.

Figure 2:
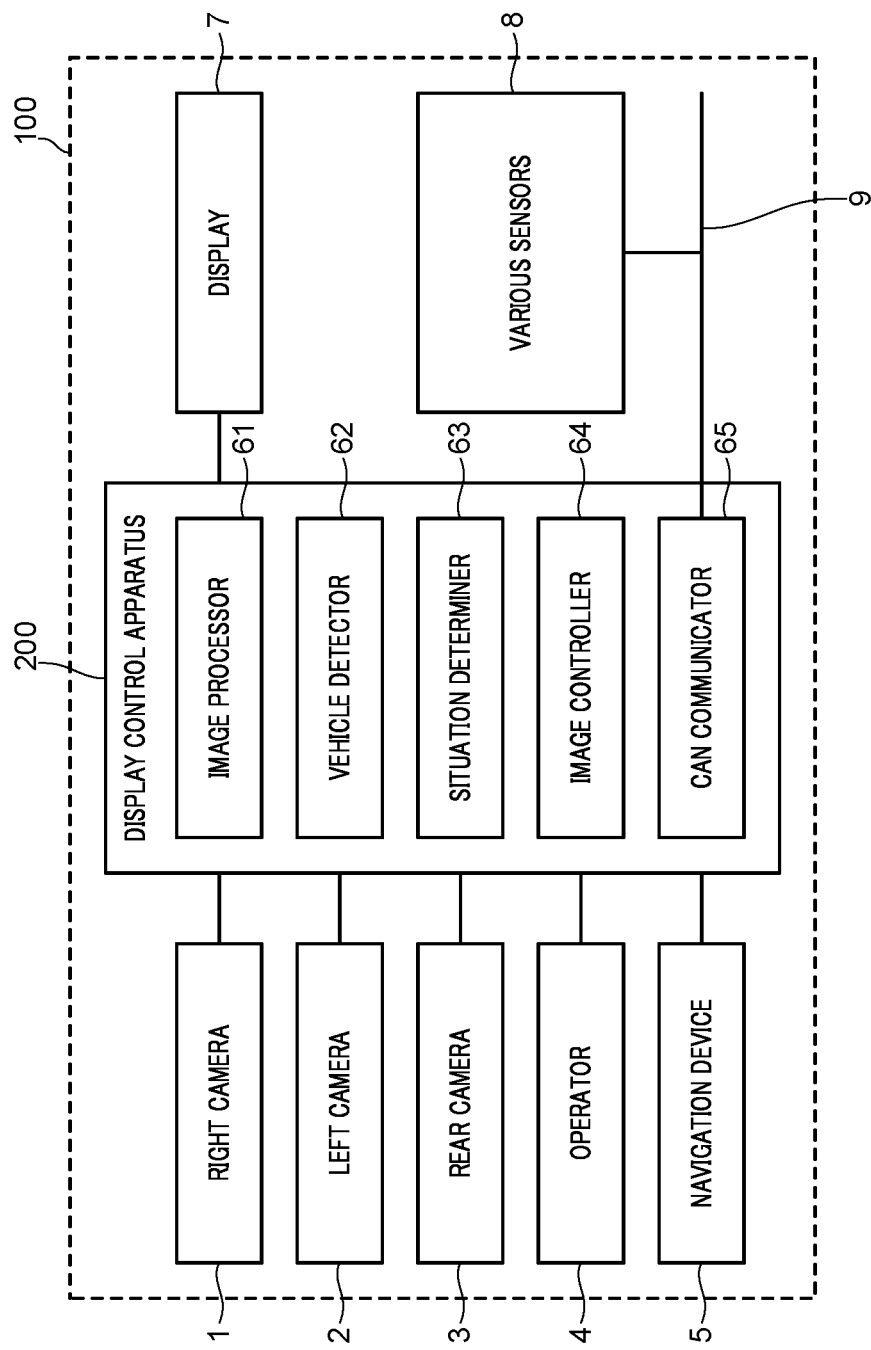
FIG. 2 illustrates an exemplary configuration of display control apparatus 200 according to the embodiment of the present disclosure.

Next, an exemplary configuration of display control apparatus 200 will be described with reference to FIG. 2. FIG. 2 illustrates an exemplary configuration of display control apparatus 200 according to the embodiment of the present disclosure.

Display control apparatus 200 is a controller that is, for example, configured with one or more Electronic Control Units (ECUs) and performs various display control processes in display 7.

Right camera 1, left camera 2, rear camera 3, operator 4, navigation device 5, and display 7 are connected to display control apparatus 200, and various sensors 8 are also connected via Controller Area Network (CAN) which is an in-vehicle network.

Operator 4 is a user interface (such as winker lever and/or switch) which receives an input operation of an occupant of vehicle 100. Display 7 is, for example, a liquid crystal display which displays a combined image. Each of various sensors 8 is, for example, a vehicle speed sensor, a steering angle sensor, a gear position sensor, and the like.

Display control apparatus 200 includes image processor 61, vehicle detector 62, situation determiner 63, image controller 64, and CAN communicator 65.

Image processor 61 combines images captured by right camera 1, left camera 2, and rear camera 3 and displays the combined image on display 7.

Vehicle detector 62 detects, based on the images captured by right camera 1, left camera 2, and rear camera 3, a following vehicle and the like present behind vehicle 100, detects a position of the following vehicle, and outputs following-vehicle information indicating whether a following vehicle has been detected and the position of the following vehicle.

Situation determiner 63 inputs the following-vehicle information output from vehicle detector 62 and operation information indicating that the input operation has been performed in operator 4, and determines a display mode in display 7, based on these pieces of information.

Image controller 64 controls parameters of conversion and combination of images according to the display mode determined by situation determiner 63. In image processor 61, the images captured by right camera 1, left camera 2, and rear camera 3 are combined according to the parameters controlled by image controller 64.

Next, with reference to FIGS. 3 to 9, descriptions will be given of a background leading to the creation of the embodiment according to the present disclosure, a conventional problem when combining captured images and the like.

<Blending>

Figure 3:
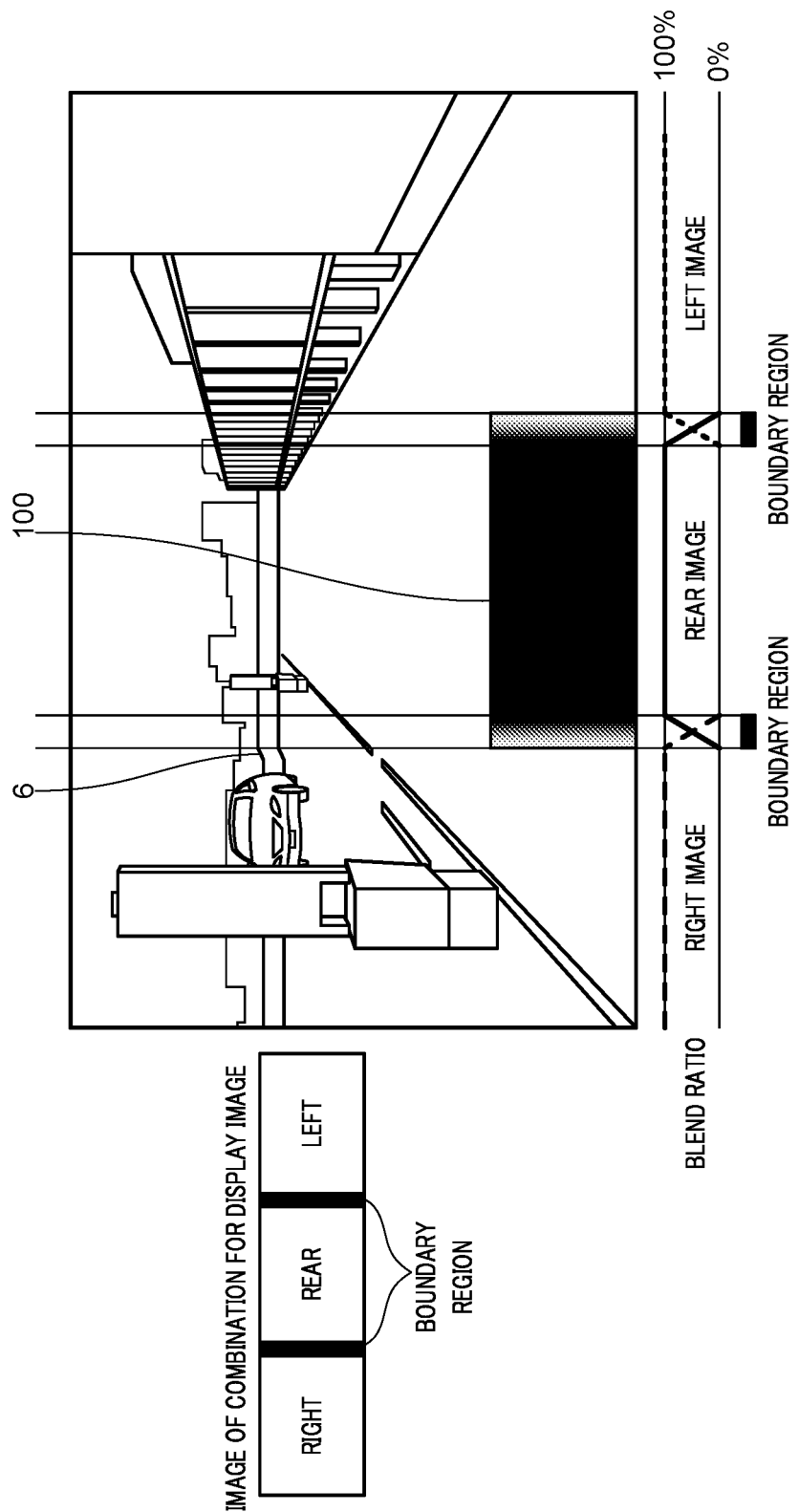
FIG. 3 illustrates an exemplary combined image that is displayed on display 7.

FIG. 3 illustrates an exemplary combined image that is displayed on display 7. FIG. 3 illustrates, on a left side thereof, an image of how images captured by right camera 1, left camera 2, and rear camera 3, respectively, are combined. On a right side of FIG. 3, a combined image displayed on display 7 is illustrated.

When a landscape behind vehicle 100 is captured by three cameras, the images captured by the respective cameras become images captured from different visual point positions. Therefore, even when objects captured by these cameras are identical with each other, a shape of figure of the object varies due to a difference in visual point position, which may cause discontinuity or distortion of an image at a joint when these images are combined.

For example, fence 6 installed at a position relatively distant from a rear of vehicle 100 extends linearly in a direction parallel to a lateral direction of vehicle 100 in a real space. However, when a height of a figure of fence 6 differs at a joint position of a combined image upon combining the captured right image and rear image, the figure of the fence is distorted without being aligned.

As a measure against this, for example, when one display image is generated such that the rear image is interposed between the right image and the left image, for example, a boundary region is provided at a boundary portion (joint portion) between the right image and the rear image, and a boundary region is also provided at a joint portion between the left image and rear image. Then, in these boundary regions, pixel values of two images (right image and rear image or left image and rear image) are blended to form a display image. This is generally referred to as "blending."

In this blending, the unnaturalness of boundary region can be made less conspicuous by lowering, as approaching from one of the two neighboring images to the other image (e.g., right image from rear image in FIG. 3), a mix ratio (blend ratio) of a pixel value of the one to the other.

<Projection Conversion and Visual Point Conversion>

Figure 4:
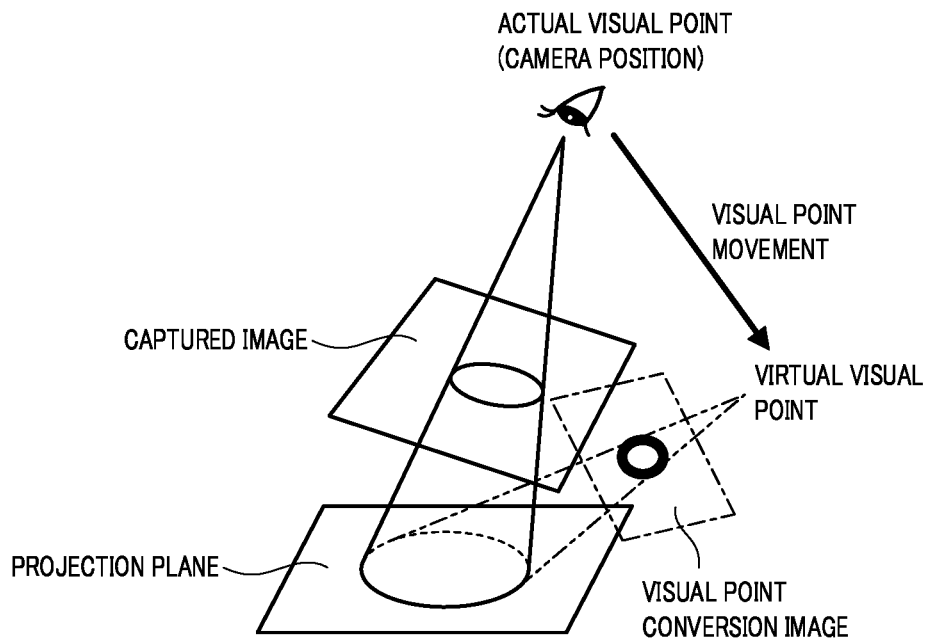
FIG. 4 is a diagram for describing a relation between projection conversion and visual point conversion.

FIG. 4 is a diagram for describing a relation between projection conversion and visual point conversion. In capturing with a camera, optical information in a three-dimensional space viewed from an actual visual point (camera position) is converted into information on a two-dimensional image (captured image). Further, projecting a two-dimensional image onto a plane on a three-dimensional space (projection plane) is called projection. When the projection plane is tilted with respect to the actual visual point, an image on the projection plane is stretched.

A process of associating pixels on the captured image with pixels on the projection plane is called mapping. The mapping allows the captured image to be converted to an image viewed from a different position. This conversion process is referred to as visual point conversion or visual point movement, and an image obtained by this conversion process is referred to as a visual point conversion image. A process of associating pixels on the projection plane with pixels on the visual point conversion image can also be called mapping.

In the image on the projection plane, a portion where a distance to the visual point is shortened by the visual point conversion is enlarged on the visual point conversion image, and a portion where the distance to the visual point is increased by the visual point conversion is reduced on the visual point conversion image. That is, an image is transformed also by the visual point conversion.

Meanwhile, when performing the projection and the visual point conversion, instead of performing the mapping in the visual point conversion after performing the mapping in the projection, mapping is also possible to associate the pixels on the captured image directly with the pixels on the visual point conversion image. A table used for the mapping at this time is called a mapping table. That is, the projection and the visual point conversion result in a process of transforming an image by using the mapping table.

<Truth/Falsehood of Virtual Visual Point>

Figure 5:
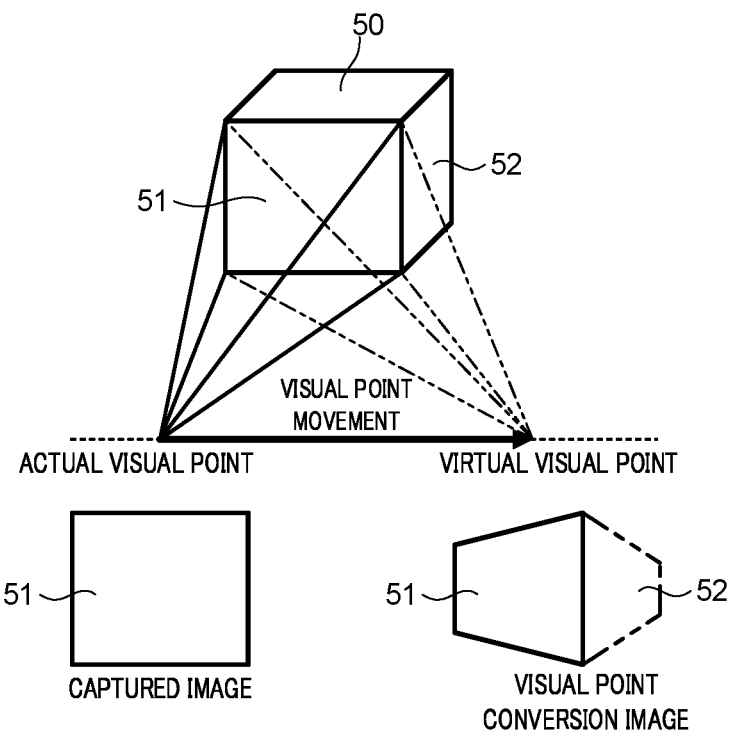
FIG. 5 illustrates an exemplary visual point conversion image resulting from the visual point conversion.

FIG. 5 illustrates an exemplary visual point conversion image resulting from the visual point conversion. When front face 51 of cube 50 illustrated in FIG. 5 is captured from the actual visual point on the drawing, an image will be made on which front face 51 is visible while side face 52 is invisible. In a case where this image viewed from the actual visual point is then converted into an image viewed from a virtual visual point on the right as in the drawing, i.e., a visual point conversion image that virtually captures cube 50 from an oblique direction, front face 51 is transformed into the same figure as the image viewed from the virtual visual point on the right as in the drawing, i.e., a figure with a reduced left side that is farther due to the visual point movement. Note that side face 52 of cube 50 that does not appear when viewed from the actual visual point is not imaged on the visual point conversion image.

That is, since the visual point conversion is a virtual visual point movement, the same image as an image captured by actually moving the visual point cannot be obtained in a visual point conversion image. In conclusion, the projection and the visual point conversion are only transformations of the captured images.

<Generation of Virtual Visual Point Image and Combined Image by Visual Point Conversion>

FIG. 6 is a diagram for describing a flow of generating a display image by combining images captured by three cameras.

In the process of generating a display image, first, each of the right image, rear image, and left image is subjected to the visual point conversion and is thereby converted into a virtual visual point image with a position of display 7 as a virtual visual point.

Next, these virtual visual point images are combined to generate one display image. With this process, the images captured by the three cameras are combined into an image as viewed from one virtual visual point, but the difference in figures depending on the position of the actual visual point remains as described above, which may cause discontinuity at a joint of the image.

<Upward Movement of Virtual Visual Point and Superimposing Combination of Model Image of Subject-Vehicle on Virtual Visual Point Image>

Figure 7:
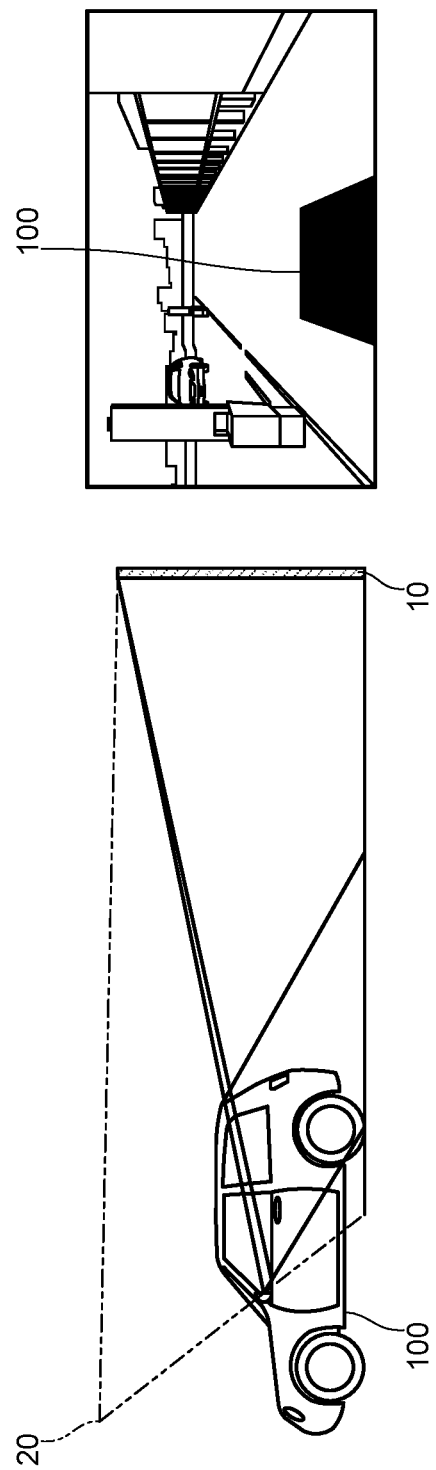
FIG. 7 is a diagram for describing a flow of generating a virtual visual point image which looks down the subject-vehicle like a bird's-eye view.

FIG. 7 is a diagram for describing a flow of generating a virtual visual point image which looks down the subject-vehicle like a bird's-eye view. In the generation process, first, as indicated on a left side of FIG. 7, virtual visual point 20 is moved forward and upward of the subject-vehicle. This makes it possible to obtain three virtual visual point images as looking down the subject-vehicle.

Next, these virtual visual point images are combined, and thus, an image is finally generated in which a model image of the subject-vehicle (e.g., trapezoid in lower portion of drawing on right side of FIG. 7 is image simulating roof of vehicle 100) is superimposed on the combined virtual visual point image as indicated in the drawing on a right side of FIG. 7.

In the actual driving situation of a vehicle equipped with a normal rearview mirror, the driver looks a rear portion of vehicle 100 and behind of vehicle 100 which are reflected in the rearview mirror so as to grasp a position of a following vehicle, referring to the rear portion of the subject-vehicle reflected in the rearview mirror (e.g., upper surface of the luggage compartment). Even in a vehicle that uses a camera without a mirror, as illustrated in FIG. 7, a criterion for grasping a positional relation with a following vehicle can be generated by virtually superimposing and combining a rear portion image of the subject-vehicle (in FIG. 7, image simulating roof) when three virtual visual point images are combined.

<Case Where Following Vehicle 11 Disappears from Display Image>

Figure 8:
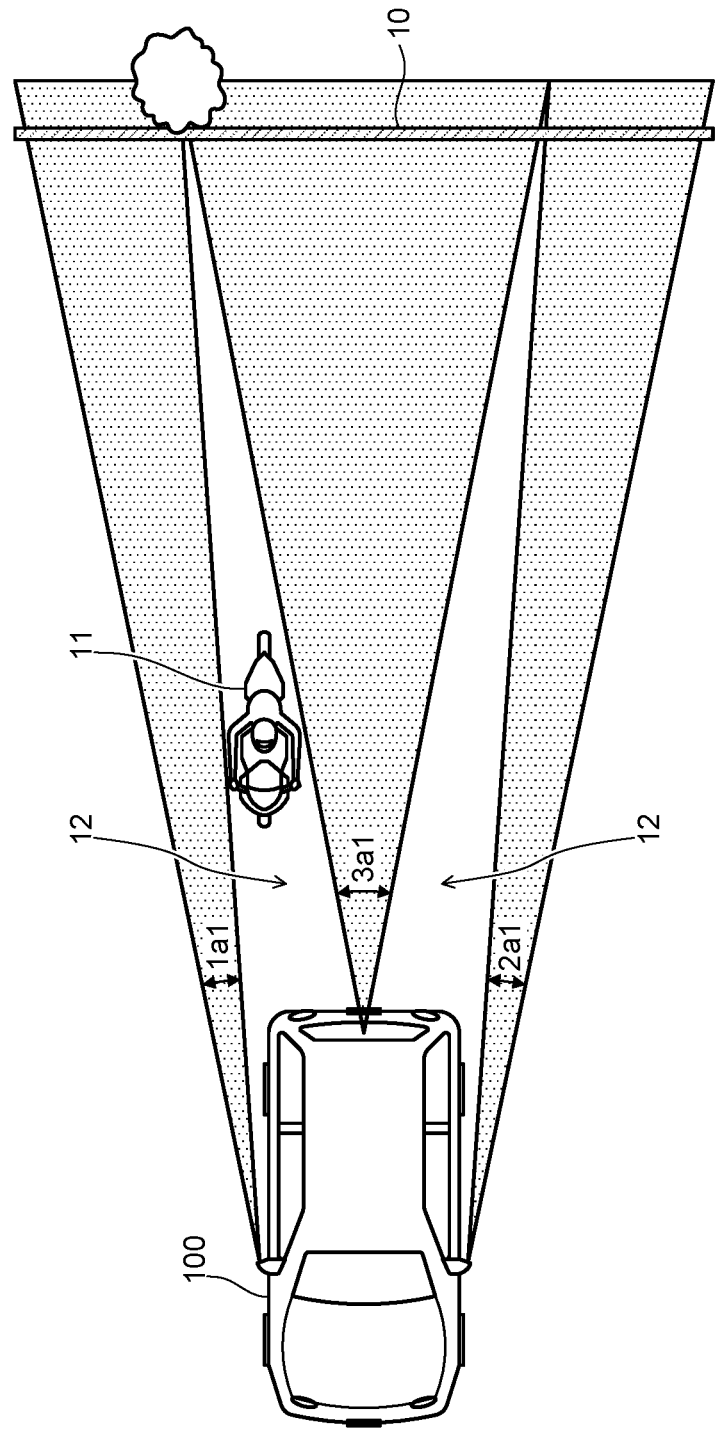
FIG. 8 is a diagram for describing a situation where following vehicle 11 disappears from the display image.

FIG. 8 is a diagram for describing a situation where following vehicle 11 disappears from the display image. When projection plane 10 is set distant from vehicle 100 and the three virtual visual point images are projected with respect to projection plane 10 contiguously in a lateral direction, a part of each of the three camera images is cropped.

Note that projection plane 10 is not limited to a flat surface and may be, for example, a bowl-shaped surface or a curved surface as described later. Further, projection plane 10 may be a cylindrical surface surrounding the entire circumference of vehicle 100 or may be a conical surface surrounding the entire circumference of vehicle 100.

Visual-field ranges of the respective three camera images have overlapping portions as illustrated in visual-field range 1a, visual-field range 2a, and visual-field range 3a of FIG. 1. In a case where a display image is made by combining the three camera images as they are, an object that appears in an overlapping visual-field range will be displayed more than once on the display image, which may confuse the driver in grasping the position of the object. Therefore, in order to avoid an overlap occurring on the display image, a cropping process is performed for generating an image of a cropped part from the visual-field range of each of the camera images. Cropping range 1a1 of FIG. 8 is the part cropped from the right image of visual-field range 1a of FIG. 1. Cropping range 2a1 of FIG. 8 is the part cropped from the left image of visual-field range 2a of FIG. 1. Cropping range 3a1 of FIG. 8 is the part cropped from the rear image of visual-field range 3a of FIG. 1.

Here, when following vehicle 11 present before the position of projection plane 10 is present in a portion not cropped from the camera images (blind-spot region 12 not displayed on background image), blind-spot region 12 becomes a blind spot of the driver looking the display image, and thus, following vehicle 11 disappears from the display image. That is, following vehicle 11 may disappear from the combined image when projection plane 10 is set at a position farther than the position of following vehicle 11.

<Case where One Object is Double-Imaged>

Figure 9:
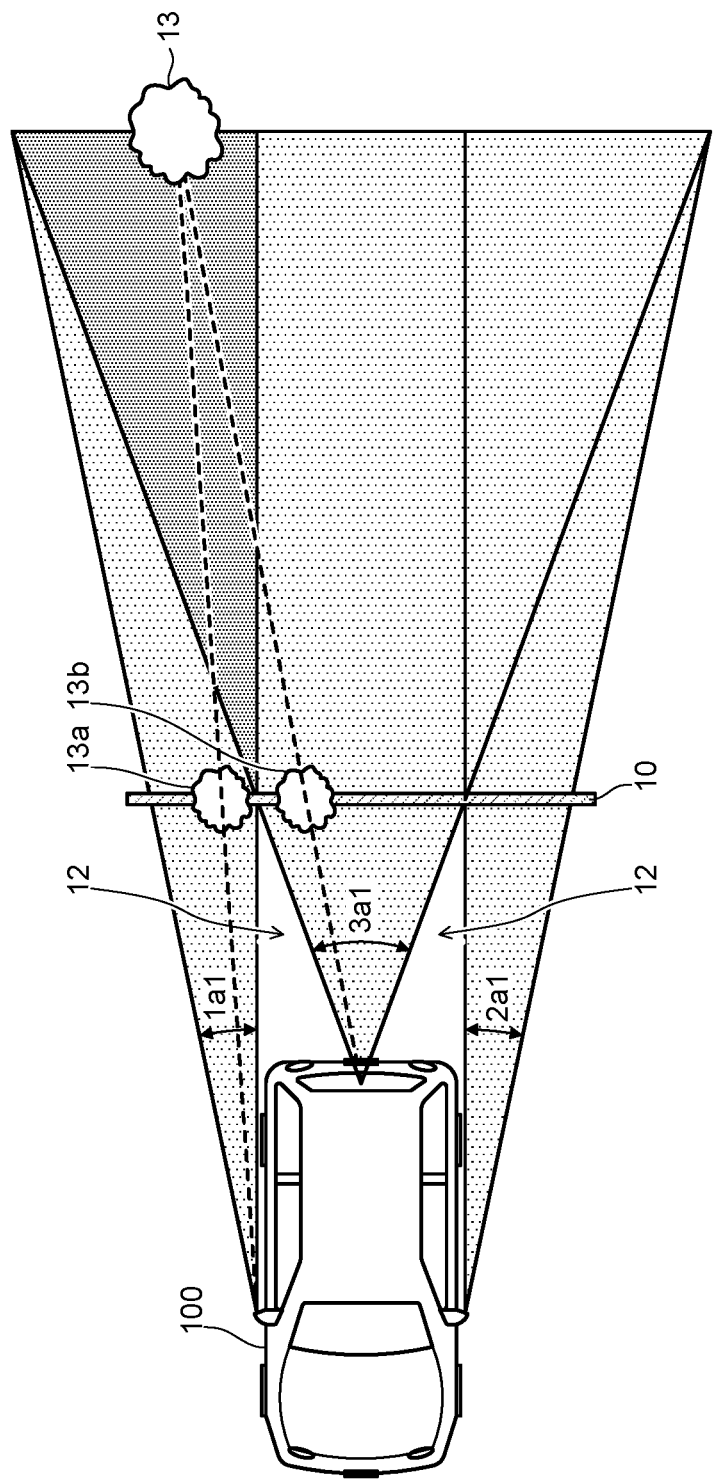
FIG. 9 is a diagram for describing a situation where one object is double-imaged on the display image.

FIG. 9 is a diagram for describing a situation where one object is double-imaged on the display image. In the following, problems of the case where projection plane 10 is set close to vehicle 100 will be described.

In the example of FIG. 9, the right image, the left image, and the rear image are cropped such that three rear images are contiguous in a lateral direction on projection plane 10 set close to vehicle 100. The width of each of cropping range 1a1, cropping range 3a1, and cropping range 2a1 is wider than that in the example of FIG. 8. In this case, cropping range 1a1, cropping range 3a1, and cropping range 2a1 do not overlap each other at the position of projection plane 10, but overlapping portions are present at positions farther than projection plane 10; accordingly, when object 13 present farther than projection plane 10 is in an overlapping portion, the object is displayed in each of two cropped ranges.

In the example of FIG. 9, a part of cropping range 1a1 and a part of cropping range 3a1 overlap at a position farther than projection plane 10, so that object 13 common to the right image and the rear image is displayed. That is, on the combined display image, one object 13 is displayed as two objects 13a and 13b. In a case where object 13 is one motorcycle, two motorcycles will be displayed on projection plane 10 set close to vehicle 100. This makes it difficult for the driver to grasp an actual position of the motorcycle correctly.

Further, for example, in a case of object 13 of one motorcycle, when the motorcycle that has been present in a portion where cropping ranges 3a1 and 1a1 overlap moves to a position included only in cropping range 1a1, only the motorcycle present in cropping range 1a1 will be displayed on display 7. Then, since the driver perceives the presence of two motorcycles, he/she may be confused into thinking that one of the motorcycles has disappeared from behind of vehicle 100 in this case.

Next, with reference to FIG. 10 and the like, examples for solving the above-described problems will be described.

Example 1

Example 1-1

Setting of Screen Projection Plane 13A

Figure 10:
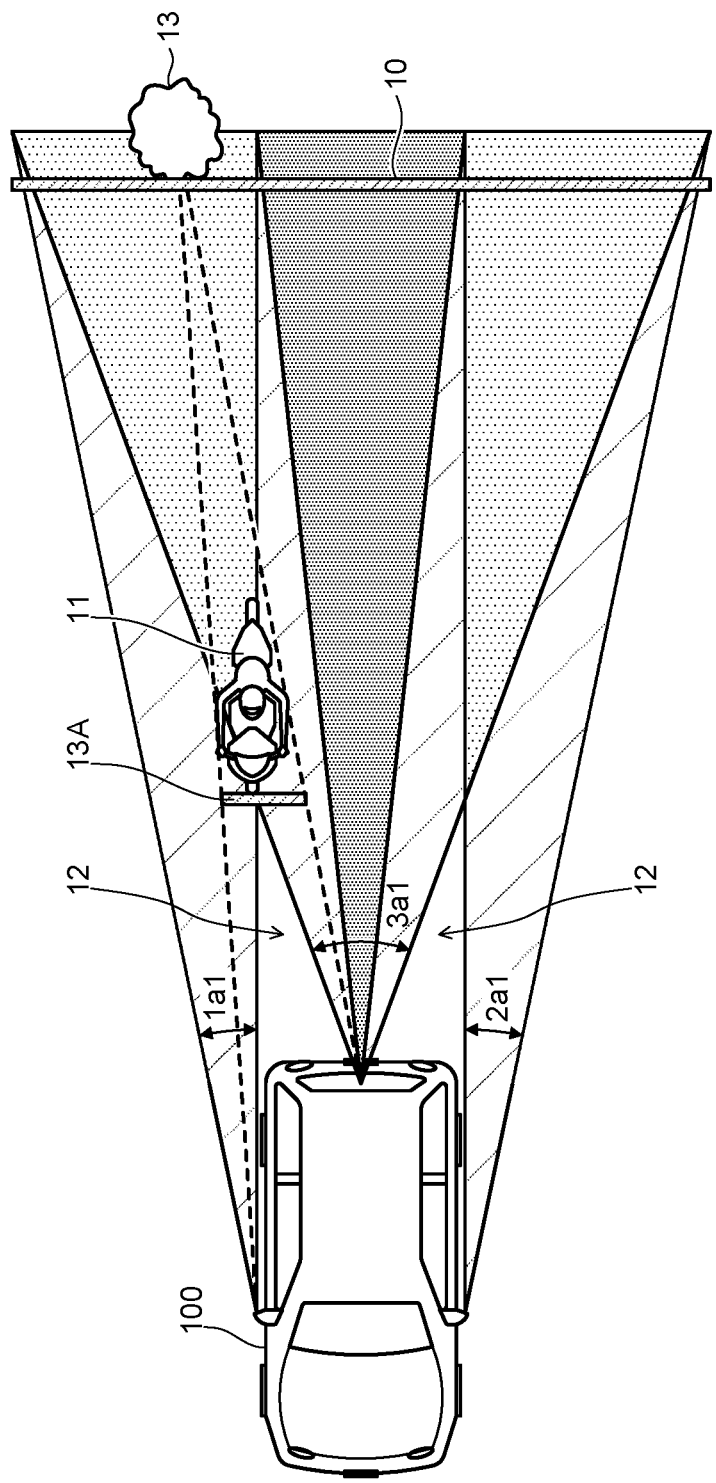
FIG. 10 is a diagram for describing a method of setting screen projection plane 13A by display control apparatus 200 according to the present embodiment.

FIG. 10 is a diagram for describing a method of setting screen projection plane 13A by display control apparatus 200 according to the present embodiment.

When detecting following vehicle 11, display control apparatus 200 sets, in a front portion of following vehicle 11, a screen-like projection plane (screen projection plane 13A) of a size which can cover following vehicle 11. Display control apparatus 200 then projects a region including a figure of following vehicle 11 within a captured image onto screen projection plane 13A and thereby generates a screen image. At this time, when no captured image includes the entire figure of following vehicle 11, two captured images may be projected onto screen projection plane 13A in order to perform combination for the entire figure of following vehicle 11 on screen projection plane 13A. When a captured image includes the entire figure of following vehicle 11, the only one captured image may be projected onto screen projection plane 13A. When only one captured image is projected onto screen projection plane 13A, the occurrence of discontinuity due to a combination can be avoided, so that a more favorable screen image can be generated. A region in which screen projection plane 13A is set will be described later.

Display control apparatus 200 also sets projection plane 10 farther than screen projection plane 13A and projects a plurality of captured images onto projection plane 10 so as to generate a background image (e.g., image including object 13).

Display control apparatus 200 then puts the screen image onto the background image and thereby generates one display image.

Incidentally, screen projection plane 13A and projection plane 10 may be a flat rectangular surface or a curved surface such as a spherical surface.

Thus, the image of following vehicle 11 is pasted on the continuous background image, which can eliminate the disappearance of following vehicle 11 and the double-imaging of following vehicle 11. That is, in order to prevent the double-imaging, in the background image, images are cropped and combined such that the images are contiguous on projection plane 10 in a distant place, and the figure of following vehicle 11 is caught by the screen image and superimposed on the background image, thus causing no disappearance of following vehicle 11.

Incidentally, when not detecting following vehicle 11, display control apparatus 200 performs no setting of screen projection plane 13A nor projecting onto screen projection plane 13A, and sets the background image to the display image.

Example 1-2

Region on which Screen Projection Plane 13A is Set

Figure 11:
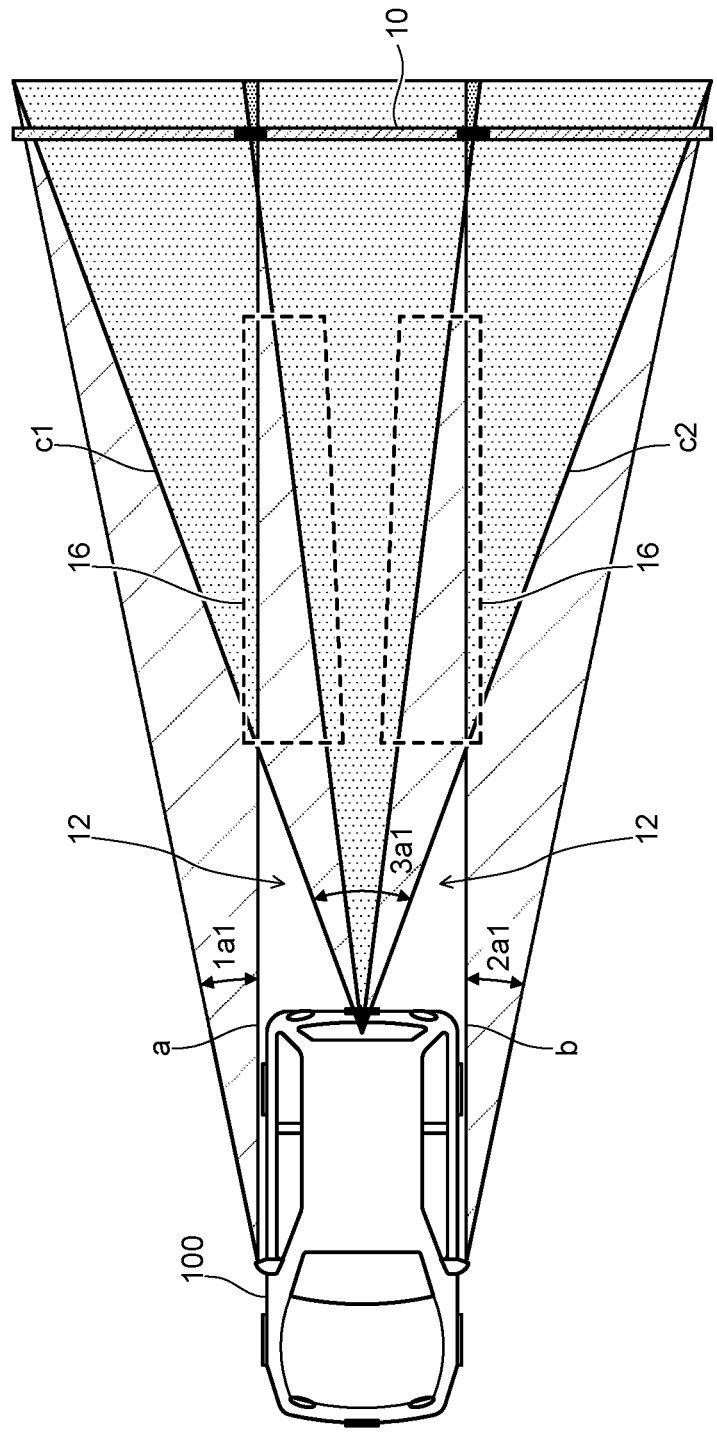
FIG. 11 is a diagram for describing a region where screen projection plane 13A is applied (i.e., screen-projection application regions 16)

FIG. 11 is a diagram for describing a region where screen projection plane 13A is applied (i.e., screen-projection application regions 16).

FIG. 11 illustrates the following edges when projecting a plurality of captured images around the vehicle onto the projection plane in order to generate a background image:

edge a near a center of cropping range 1a1 of the captured image by the right camera, edge b on a center of cropping range 2a1 of the captured image by the left camera, and edge c1 on the right and edge c2 on the left of cropping range 3a1 of the captured image by the rear camera. Cropping that is performed in a case of projecting the plurality of captured images around the vehicle onto this projection plane is cropping that limits a range for projection from the plurality of captured images around the vehicle in order to make the background image a continuous image, specifically, the cropping is performed such that a portion overlapping an adjacent image is excluded from the range to be projected. Incidentally, in the example of FIG. 11, assuming the blending, the cropping is performed such that narrow overlapping portions remain as margins for the blending. Screen-projection application regions 16 are each set to include a region that is included in visual-field range 3a of the rear camera, but that is not displayed on the background image when the cropping is performed to make the background image a continuous image.

As an example when the cropping is performed to make the background image a continuous image, FIG. 8 is also to be referred to. As illustrated in FIG. 8, when the cropping is performed which limits the range for projection from the plurality of captured images around the vehicle in order to make the background image a continuous image, blind-spot region 12 that is not displayed on the background image is enlarged. Consequently, when motorcycle 11 enters here, the motorcycle disappears from the background image. Even in the example of FIG. 11, a region between edge of cropping range 1a1 and edge c1 of cropping range 3a1 is blind-spot region 12 not displayed on the background image, the region is much smaller in range than blind-spot region 12 of FIG. 8 and is limited to an immediate vicinity of vehicle 100, however. An image of following vehicle 11 that has entered this bind-spot region 12 may disappear from the background image, but the bind-spot is inevitably generated due to the restrictions on an arrangement of the cameras, and it can be said that a following vehicle with a normal vehicle-to-vehicle distance does not enter there. Accordingly, bind-spot region 12 of FIG. 11 is not included in screen-projection application regions 16.

Display control apparatus 200, as described above, sets each screen-projection application region 16 to include a region that is included in visual-field range 3a of the rear camera, but that is not displayed on the background image when the cropping is performed to make the background image a continuous image, and then sets screen projection plane 13A described above on a front end portion of screen-projection application region 16 that has been set. The reason that screen-projection application region 16 is set wider than the region that is included in visual-field range 3a of the rear camera, but that is not displayed on the background image when the cropping is performed to make the background image a continuous image is to avoid a case where a part of a vehicle body of the following vehicle becomes invisible and the driver is thus prevented from grasping a situation due to application of the screen projection even when the part of the vehicle body of the following vehicle enters the region to be not displayed on the background image.

Incidentally, within the background image, in a region where an image captured by one camera is alone projected (e.g., cropping range 1a1 of FIG. 11), following vehicle 11 does not disappear nor is double-imaged even when the cropping is performed to make the background image a continuous image. Hence, there is no need to set screen-projection application region 16 on the region. In FIG. 11, a region just behind vehicle 100, interposed between two screen-projection application regions 16 is always displayed on the background image, and no double-imaging occurs therein; thus, the region is excluded from setting of screen-projection application regions 16.

Moreover, even when screen-projection application region 16 is applied to a position near projection plane 10 or a position farther than projection plane 10, there is no significant difference compared to the case of not applying; thus, screen-projection application region 16 need not be set on these positions.

Example 1-3

Setting Height of Screen Projection Plane 13A

Figure 12:
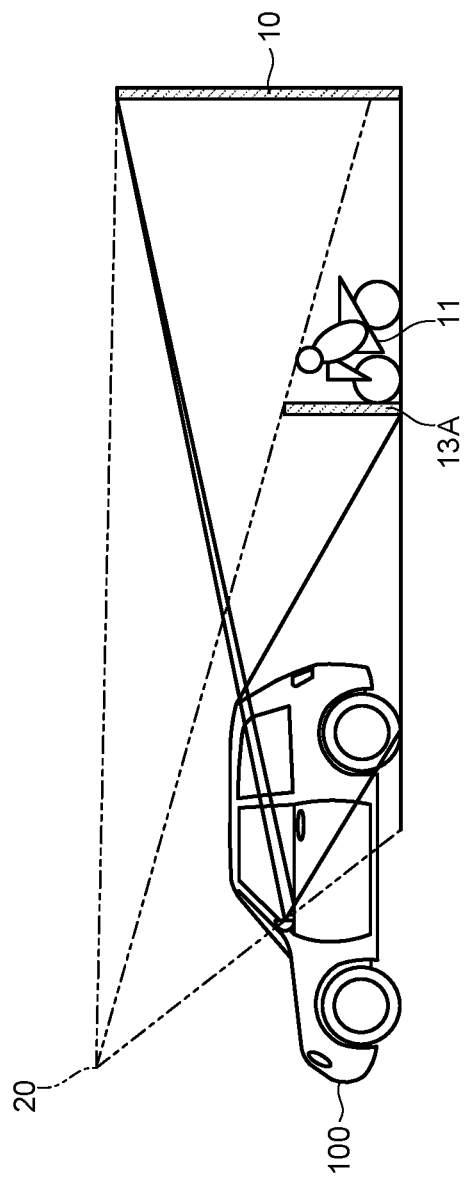
FIG. 12 is a diagram for describing a height of screen projection plane 13A.

FIG. 12 is a diagram for describing a height of screen projection plane 13A.

The height of screen projection plane 13A is set to include a region from a top end to a bottom end of following vehicle 11 when following vehicle 11 is viewed from virtual visual point 20.

An image of following vehicle 11 need not be displayed on a region above the top end of screen projection plane 13A, so that the background image on display image projection plane 10 is selected for the region. Thus, in a portion above screen projection plane 13A, the background image is displayed without being obstructed by screen projection plane 13A. The background image is selected also in a portion below screen projection plane 13A, and thus, a portion where the road surface appears is displayed without being obstructed by screen projection plane 13A.

According to Example 1, since setting of screen projection plane 13A makes it possible to project an image of following vehicle 11 onto screen projection plane 13A, the disappearance of following vehicle 11 can be prevented.

In addition, even when screen projection plane 13A is set, in projection plane 10 as a whole, the background image can be viewed continuously without being double-imaged at least in the region that is not obstructed by screen projection plane 13A, which causes no sense of incongruity to the driver with respect to the background image.

Moreover, even when a distant object is double-imaged in the vicinity of an image of following vehicle 11, the region of double-imaging is relatively narrow, and therefore, visual recognition is not obstructed.

Example 1-4

Blending of Boundary Portion Between Screen Projection Plane 13A and Projection Plane 10>

Figure 13:
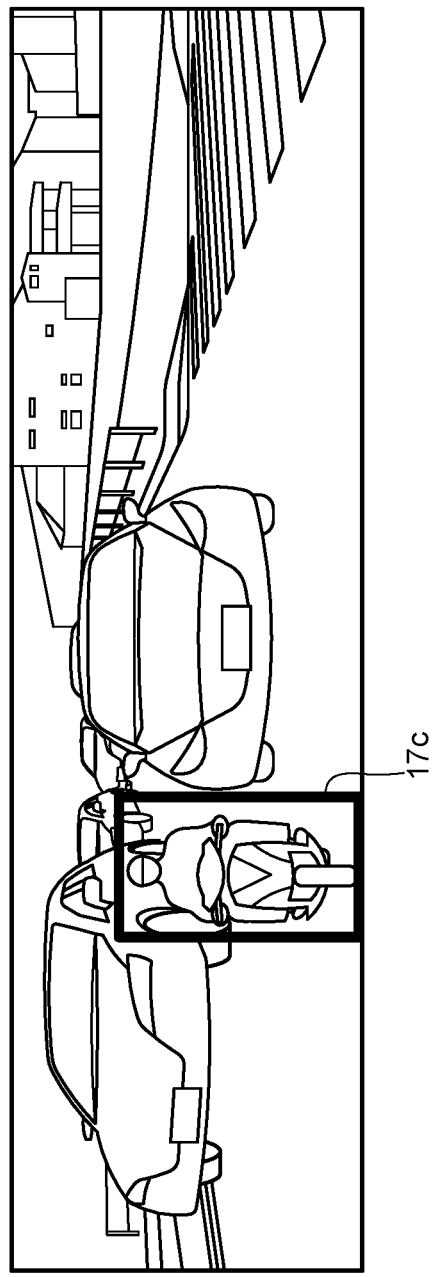
FIG. 13 is a diagram for describing a blending process for a boundary portion between screen projection plane 13A and projection plane 10.

FIG. 13 is a diagram for describing a blending process for a boundary portion between screen projection plane 13A and projection plane 10.

When screen projection plane 13A is set, the screen projection image on screen projection plane 13A and the background image on projection plane 10 become discontinuous; accordingly, display control apparatus 200 may provide, in a marginal portion of the screen projection image on screen projection plane 13A, boundary region 17c between the screen projection image and the background image, and may perform blending such that, in boundary region 17c, the transmittance of the screen projection image consecutively rises and thus the screen projection image gradually blends into the background image as the screen projection image extends outward.

A boundary portion of different images may also be discontinuous in generating the background image, so that a boundary region may be provided for blending. For example, in the upper drawing of FIG. 14, which will be described later, boundary region 17a is a boundary region between a right image and a rear image, and boundary region 17b is a boundary region between a left image and a rear image. Providing boundary regions 17a and 17b and calculating a pixel value of a combined image by weighted addition in which the closer the adjacent image is, the smaller the weight is make it possible to perform pixel blending such that adjacent images are blended into each other, and a boundary line (border) between the background image and the screen image can thereby be made less noticeable. In addition, when a plurality of camera images is used for generating the screen projection image, boundary regions may be provided for blending in boundary portions of the images. Thus, performing the blending for a boundary portion of images which may be discontinuous can prevent a boundary portion from being unnatural and drawing the driver's attention.

Example 1-5

Setting of a Plurality of Screen Projection Planes 13A

Display control apparatus 200 may be configured to set a plurality of screen projection planes 13A depending on the number of following vehicles 11.

By way of example, in a situation where screen projection plane 13A is set for only particular following vehicle 11 among the plurality of following vehicles 11 when a plurality of following vehicles 11 is present, an image of following vehicle 11 for which screen projection plane 13A is set is projected onto screen projection plane 13A, and an image of another following vehicle 11 is projected onto the background projection plane. As a result, the image of following vehicle for which screen projection plane 13A is not set is doubled in a boundary region of a boundary portion of the image or is stretched by being projected farther than the original position.

To solve such a problem, when a plurality of following vehicles 11 is detected, display control apparatus 200 sets, in a front portion of each of detected following vehicles 11, a screen-like projection plane (screen projection plane 13A) of a size which can cover a corresponding one of following vehicles 11.

Thus, the images of the plurality of following vehicles 11 are projected onto the actual positions of following vehicles 11, doubling or stretching in boundary regions can be suppressed.

Example 2

Example 2-1

Dynamic Control for Boundary Region

In Example 2, a description will be given of an example of eliminating the disappearance of following vehicle 11 by dynamically controlling a boundary portion (boundary regions 17a and 17b) between an image on screen projection plane 13A and an image on projection plane 10, in place of the setting of screen projection plane 13A.

Figure 14:
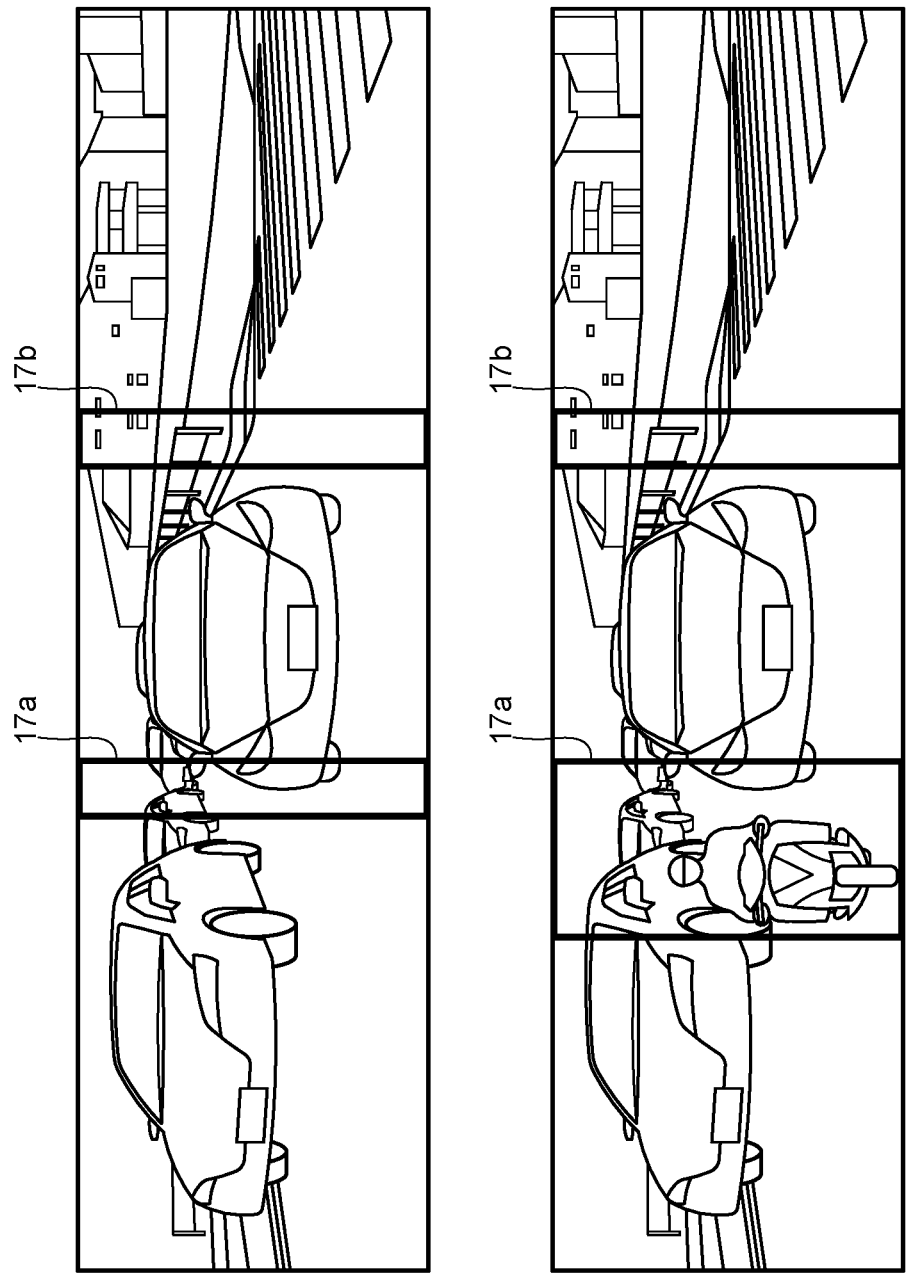
FIG. 14 is a diagram for describing a method of dynamically controlling boundary regions 17a and 17b.

FIG. 14 is a diagram for describing a method of dynamically controlling boundary regions 17a and 17b. Following vehicle 11 disappears when, for example, following vehicle 11 enters near a boundary between the rear image and the right image.

Display control apparatus 200 is configured such that boundary regions 17a and 17b include a region in which following vehicle 11 may disappear. Specifically, in a case where a figure of following vehicle 11 is positioned near boundary region 17a as illustrated in the lower drawing of FIG. 14, boundary region 17a is widened so that the figure of following vehicle 11 is included in boundary region 17a. In this boundary region, pixels of the rear image and pixels of the right image are blended to generate pixels of the display image; therefore, the figure of following vehicle 11 is displayed on the display image as long as the figure of following vehicle 11 is included in at least one of the rear image and the right image. This can avoid the disappearance of following vehicle 11 near the boundary between the rear image and the right image.

In FIG. 14, a right edge of boundary region 17a is fixed, and a left edge of boundary region 17a is moved to the left to include the figure of following vehicle 11 in the boundary region, but control may be performed such that the right edge of boundary region 17a also is moved in accordance with a position of the figure of following vehicle 11. For example, by the right edge of boundary region 17a also being moved to the left, a position of the entire boundary region may be moved so that the figure of following vehicle 11 is positioned in a center of boundary region 17a. Although FIG. 14 indicates the example in which the figure of following vehicle 11 is positioned near the boundary between the rear image and the right image, when the figure of following vehicle 11 is positioned near a boundary between the rear image and the left image, boundary region 17b may be widened to include the figure of following vehicle 11, and in this boundary region, the pixels of the rear image and pixels of the left image may be blended to generate pixels of the display image. Thus, display control apparatus 200 includes the image of following vehicle 11 in boundary region 17a or 17b and performs blending in boundary regions 17a and 17b and can thereby avoid disappearance of following vehicle 11 near the boundary between the rear image and the left or right image while making the unnaturalness of boundary regions 17a and 17b less noticeable. As the region near the boundary between the rear image and the left or right image, the same region may be set as the region on which screen projection plane 13A is applied (screen-projection application region 16) as described with reference to FIG. 11.

Example 2-2

Control for Widths of Boundary Regions 17a and 17b Depending on the Presence or Absence of Following Vehicle 11

Display control apparatus 200 may be configured not to widen boundary regions 17a and 17b when no following vehicle 11 is detected and to widen the boundary regions when following vehicle 11 is detected. Further, display control apparatus 200 senses a width of the figure of following vehicle 11 and may determine whether to widen widths of boundary regions 17a and 17b in accordance with the width of the figure of following vehicle 11.

For example, when following vehicle 11 is detected, display control apparatus 200 determines a width of following vehicle 11 and a range in which following vehicle 11 appears. In a case where following vehicle 11 is narrower than a predetermined width, display control apparatus 200 determines that following vehicle 11 is a motorcycle while determining following vehicle 11 as a four-wheeled vehicle in a case where following vehicle 11 is wider than the predetermined width.

In a case where following vehicle 11 is a four-wheeled vehicle, since a vehicle width of a four-wheeled vehicle is wider than a vehicle width of a motorcycle, the entire figure of the four-wheeled vehicle is unlikely to disappear from the display image, and it is considered that even when a part of the four-wheeled vehicle disappears from the display image, oversight of following vehicle 11 may not be caused. Therefore, when determining following vehicle 11 as a four-wheeled vehicle because of its wide width, display control apparatus 200 may perform control such that a width of a boundary region in the vicinity of the four-wheeled vehicle is maintained to be constant.

In a case where following vehicle 11 is a motorcycle, since a vehicle width of a motorcycle is narrower than a vehicle width of a four-wheeled vehicle, the entire figure of the motorcycle is likely to disappear from the display image. Therefore, when determining following vehicle 11 as a motorcycle because of its narrow width, display control apparatus 200 may perform control such that a width of a boundary region in the vicinity of the motorcycle is widened.

Further, display control apparatus 200 may evaluate a distance from the figure of following vehicle 11 on the image to a boundary between the rear image and the left or right image and may widen the boundary region only when the figure of following vehicle 11 is present near the boundary. In a case where the position of the figure of following vehicle 11 is away from the boundary, a subsequent necessity determination process can be omitted, which can reduce a load on determining whether to widen a boundary region.

Incidentally, display control apparatus 200 may be configured to evaluate a distance to following vehicle 11 and an approach speed and to perform the above-mentioned blending with respect to a boundary region in the vicinity of following vehicle 11 only when the possibility of interference with vehicle 100 is detected. For example, when a vehicle-to-vehicle distance in between with following vehicle 11 is greater than a predetermined value and the vehicle-to-vehicle distance is not reduced, following vehicle 11 is determined it has no possibility of interference with vehicle 100, and widening of the boundary region may also be determined to be unnecessary. This can avoid unnecessary blurring (defocusing) of the image due to the double-imaging in the boundary region.

Example 2-3

Control for Width of Boundary Region According to Position of Following Vehicle 11

Figure 15:
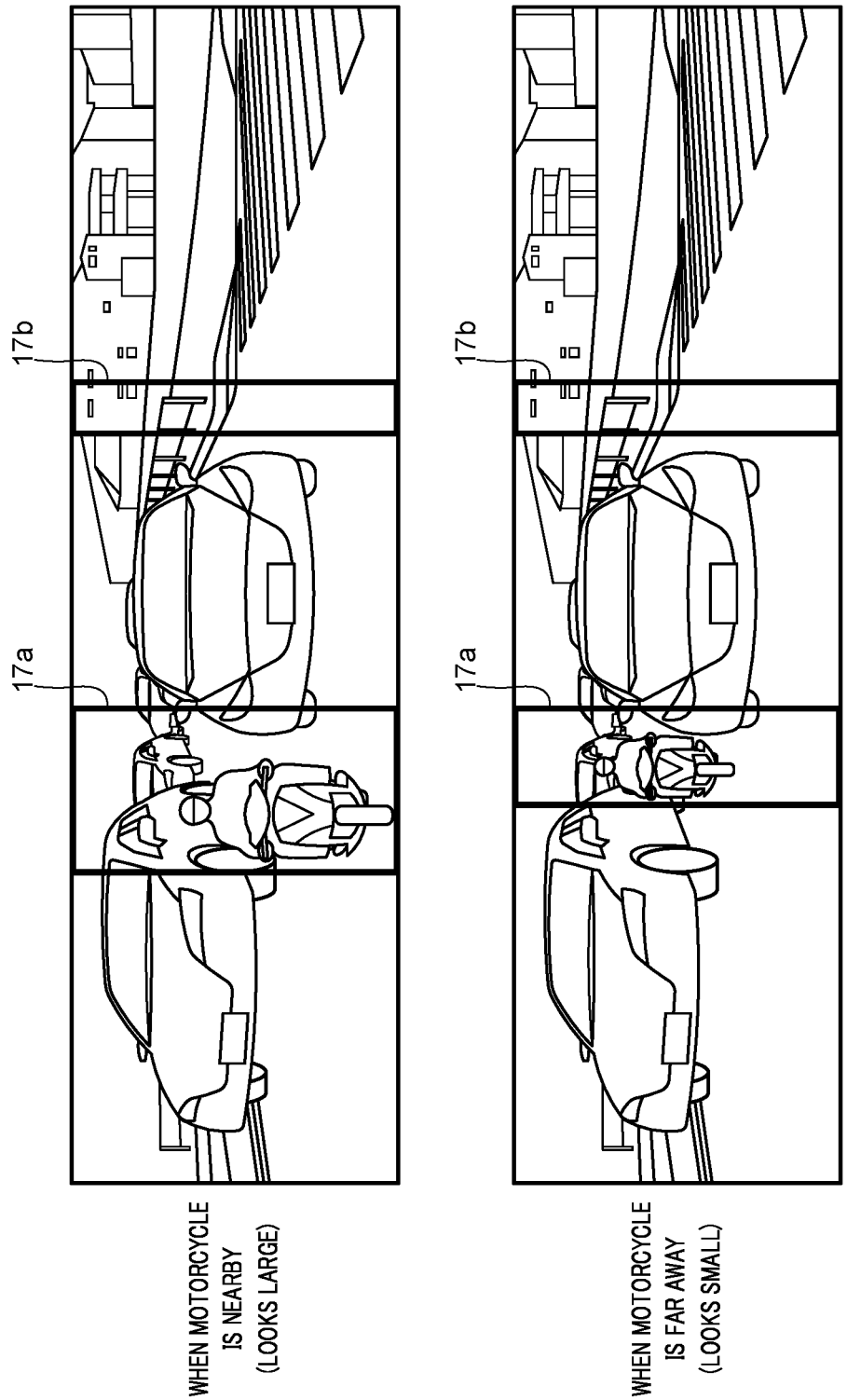
FIG. 15 is a diagram for describing control for a width of a boundary region according to a position of following vehicle 11.

FIG. 15 is a diagram for describing control for a width of a boundary region according to a position of following vehicle 11.

Since an image is blurred due to the double-imaging in a boundary region, a width of the boundary region is preferably narrow. Meanwhile, a movement amount of following vehicle 11 present on the image when following vehicle 11 present around the subject-vehicle moves in a lateral direction becomes larger than the movement amount of following vehicle 11 on the image when following vehicle 11 present away from the subject-vehicle moves in a lateral direction. Then, when the control for a width of the boundary region does not follow up the lateral movement of following vehicle 11, the figure of following vehicle 11 is more likely to turn away from the boundary region and disappear from the display image.

Therefore, for example, when following vehicle 11 having a narrow width is present at a position away from the subject-vehicle, display control apparatus 200 may perform control such that a width of a boundary region in the vicinity of following vehicle 11 is narrowed, and the width of the boundary region is widened consecutively or stepwise as following vehicle 11 approaches the subject-vehicle.

This makes it possible to prevent the figure of following vehicle 11 from turning away from the boundary region and disappearing from the display image as well as to suppress blurring of the image due to the double-imaging.

Further, even when the detecting process for following vehicle 11 is delayed, it is possible to prevent following vehicle 11 from disappearing from the boundary region by increasing the width of the boundary region in the vicinity of following vehicle 11.

Example 2-4

Control for Blend Ratio in Boundary Region

Figure 16:
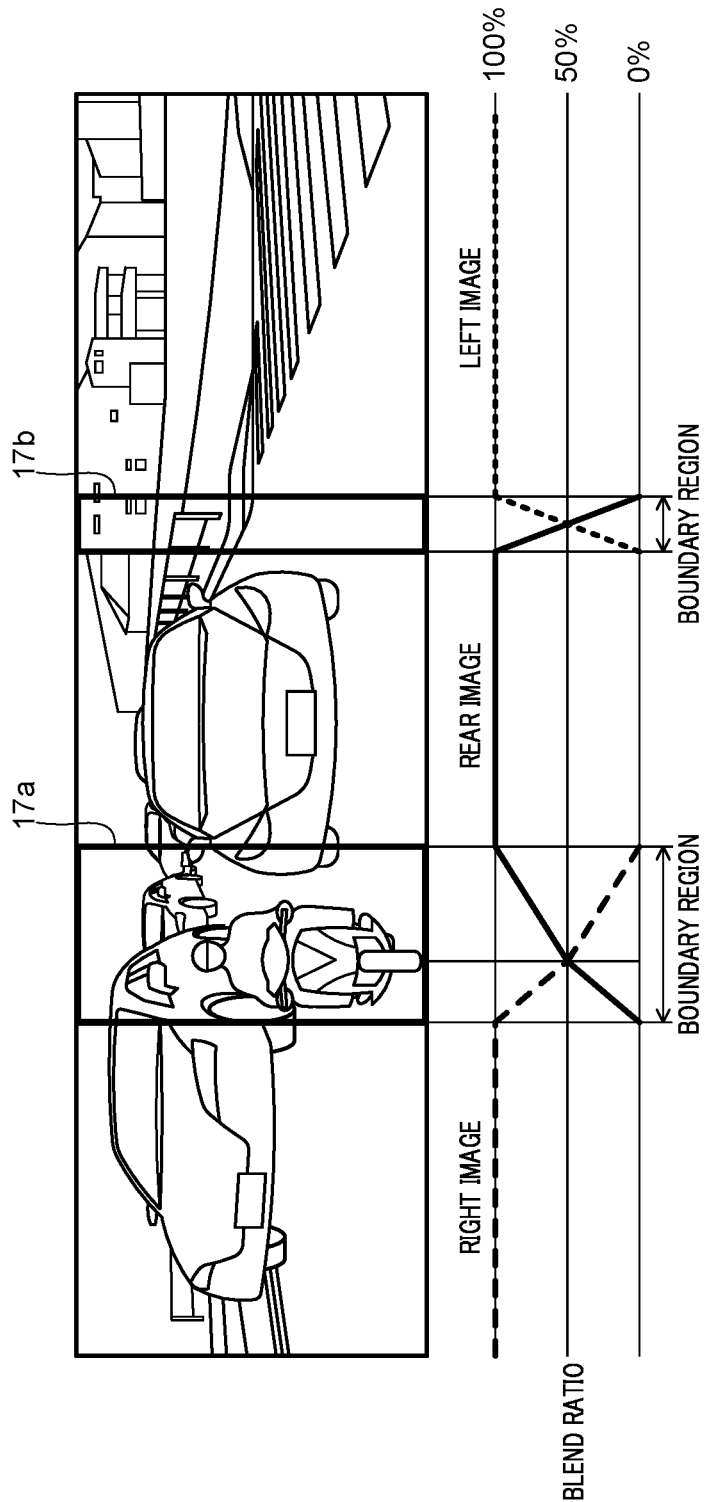
FIG. 16 is a diagram for describing control for a blend ratio in a boundary region.

FIG. 16 is a diagram for describing control for a blend ratio in a boundary region.

Display control apparatus 200 may detect a center position of the figure of following vehicle 11 or a position of the driver's face (or head) of following vehicle 11 and then perform control such that a cross point, at which the blend ratio between an image on the right side and an image on the left side relative to the boundary region is one to one, matches the center position of following vehicle 11 or the position of the driver's face (or head) of following vehicle 11. While the technique of face recognition for detecting a face image from an image is publicly known, and a detailed description thereof is omitted, the face recognition is performed by pattern matching that evaluates a degree of matching with a dictionary image and may be an algorithm that evaluates the degree of matching with a plurality of dictionary images and recognize a face when it matches with any of them. Although wearing a helmet makes parts of the driver's face invisible, it is possible to detect the driver's face (or head) wearing the helmet and specify the position by adding a dictionary image that matches with an image of the driver's shoulder and above wearing the helmet.

The blend ratio at a boundary region varies depending on a position of the figure relative to the boundary region. For example, in a case where the figure of a motorcycle is present at a position with a lower blend ratio (e.g., near 0%) close to an edge of the boundary region, a display image is formed in which the figure of the motorcycle is extremely thinly mixed and a background image without the motorcycle is densely mixed therewith. Consequently, the driver may overlook the motorcycle since the motorcycle is thinly displayed.

Thus, by making the blend ratio one to one at a center position of the image of following vehicle 11 or at a position of the driver's face of following vehicle 11, which is the focused position when the driver visually recognizes the motorcycle, the image of the motorcycle is displayed with approximately half the density, thereby reducing the risk of overlooking following vehicle 11. Further, since the driver's face can be visually recognized, it is also easy to predict the next movement of the motorcycle.

Effect of Example 2

As described above, when a motorcycle enters a blind spot formed between a visual-field range of the left or right camera image and a visual-field range of the rear camera on the display image, and the figure of the motorcycle possibly disappears from the display image, it is possible to prevent the disappearance of the image of the motorcycle by widening a width of a boundary region, in which the camera image of the left or right camera and the camera image of the rear camera are blended and displayed, to include the figure of the motorcycle.

Further, since controlling the boundary region allows the image display using only one projection plane 10, an image process amount is small, as compared with the case of using both screen projection plane 13A and projection plane 10, thereby shortening the display delay time from the detection of following vehicle 11 to the displaying of the display image on display 7.

Further, shortening the display delay time makes it possible to shorten the time from when a surrounding situation of the subject-vehicle changes until a driving operation corresponding to a surrounding situation after the change is performed.

Example 3

Next, a description will be given of Example 3 with reference to FIG. 17 and the like. Incidentally, Example 3 can be combined with Example 1 or Example 2.

Example 3-1

Position Control for Virtual Visual Point 20 Depending on the Presence or Absence of Following Vehicle 11

Figure 17:
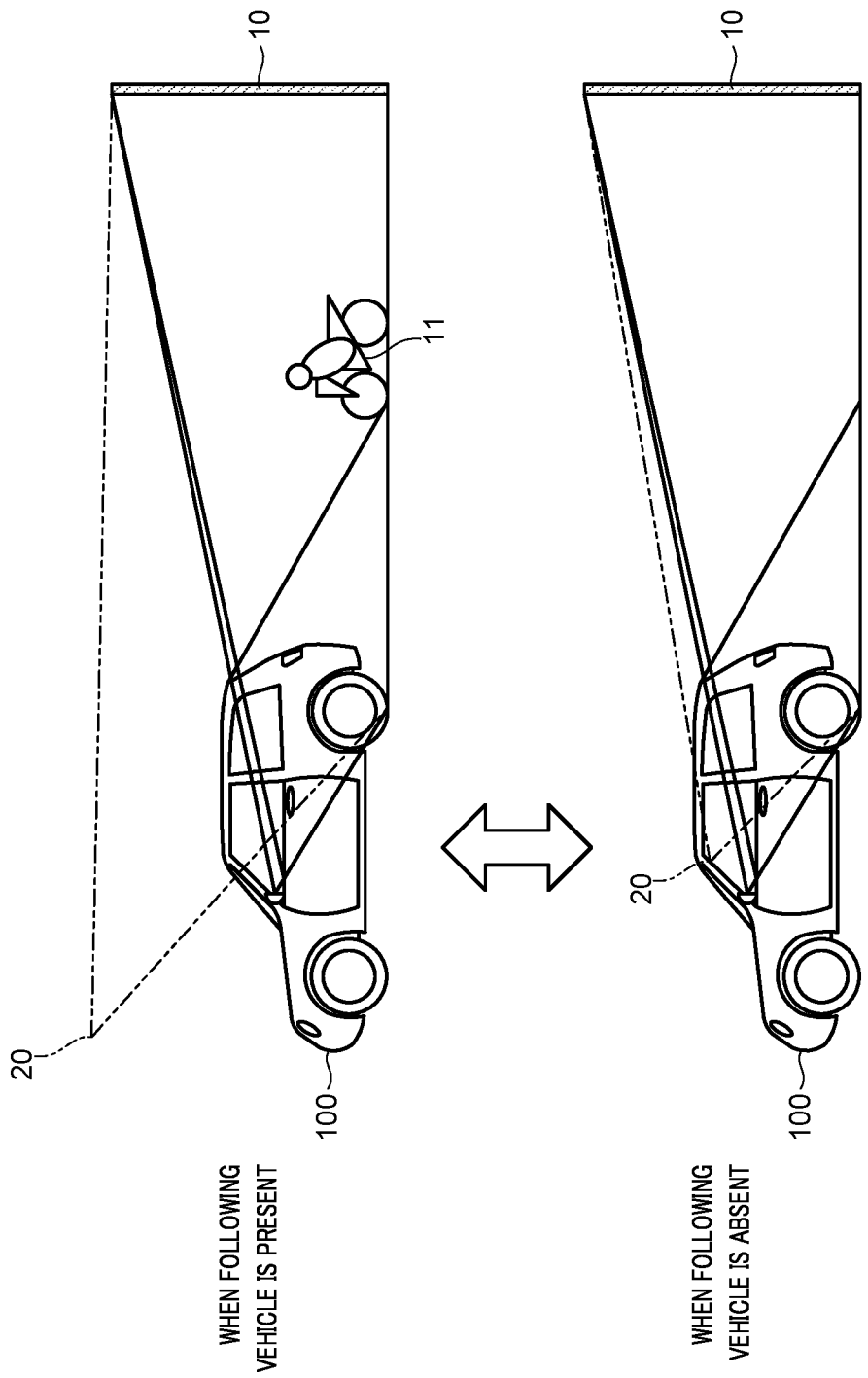
FIG. 17 is a diagram for describing a control method for a position of virtual visual point 20 depending on the presence or absence of following vehicle 11.

FIG. 17 is a diagram for describing a control method for a position of virtual visual point 20 depending on the presence or absence of following vehicle 11.

Display control apparatus 200 performs control such that virtual visual point 20 is set to, when following vehicle 11 is present, a higher position relative to the road surface whereas visual point 20 is set to, when following vehicle 11 is absent, a lower position relative to the road surface of a case where following vehicle 11 is present.

Setting virtual visual point 20 to a higher position relative to the road surface makes it possible to provide an image which looks down the vehicle from a higher position, so that the movement of the subject-vehicle and following vehicle 11 on the road surface can be easily grasped.

Meanwhile, setting virtual visual point 20 to a higher position relative to the road surface causes a situation where, on a display screen, a movement of a fixed object such as a road marking generated by the movement of the vehicle appears to be a larger movement, which draws the driver's attention. This may be rephrased as setting virtual visual point 20 higher results in higher gaze guidance. Since the driver is required to look ahead while driving, it is better not to draw a gaze unnecessarily. In a case where following vehicle 11 is absent, setting virtual visual point 20 to a lower position relative to the road surface reduces a movement of the road surface on display 7, thereby preventing unnecessary gaze drawing.

Example 3-2

Figure 18:
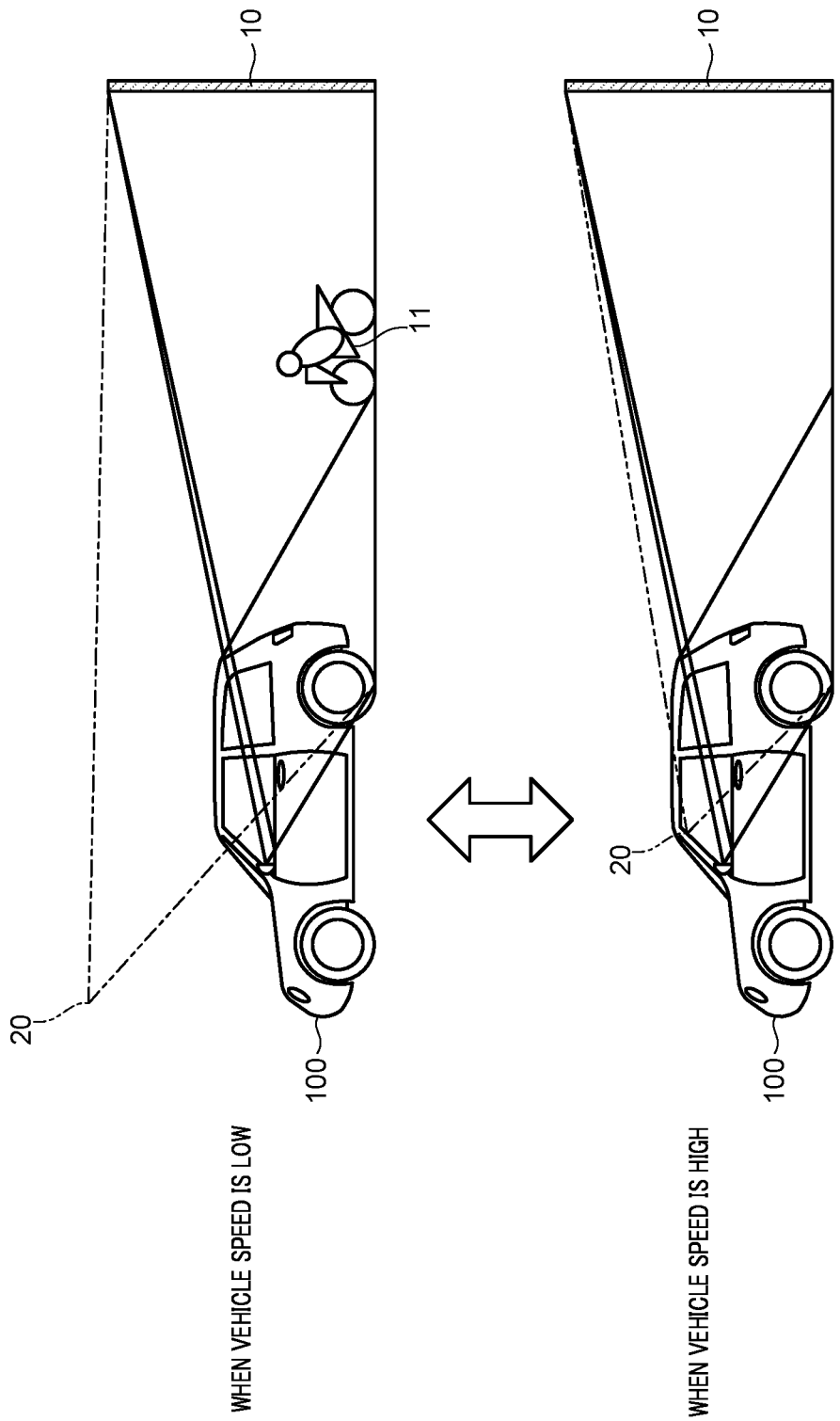
FIG. 18 is a diagram for describing a control method for a position of virtual visual point 20 in accordance with a speed of the subject vehicle.

Position Control for Virtual Visual Point 20 in Accordance with Speed of Subject-Vehicle FIG. 18 is a diagram for describing a control method for a position of virtual visual point 20 in accordance with a speed of the subject vehicle.

Display control apparatus 200 may be configured to set virtual visual point 20 to a higher position or a lower position relative to the road surface in accordance with a speed of the subject-vehicle.

When the speed of the subject-vehicle is low, since a movement of the road surface on a screen is reduced, a gaze is less likely guided to the moving road surface. Therefore, display control apparatus 200 sets virtual visual point 20 to a higher position relative to the road surface when the speed of the subject-vehicle is equal to or less than a predetermined speed, whereas when the speed of the subject-vehicle exceeds the predetermined speed, display control apparatus 200 sets virtual visual point 20 to a lower position relative to the road surface than when the speed of the subject-vehicle is equal to or less than the predetermined speed.

This makes it easier to grasp the movement of the subject-vehicle and following vehicle 11 while preventing unnecessary gaze drawing to the moving road surface. This control in accordance with the speed of the subject-vehicle may be performed in combination with the control depending on the presence or absence of following vehicle 11. For example, a control may be performed such that virtual visual point 20 is set to a higher position in a case where the speed of the subject-vehicle is low and following vehicle 11 is present whereas virtual visual point 20 is set to a lower position in other cases, or a control may be performed such that virtual visual point 20 is set to a lower position only in a case where the speed of the subject-vehicle is high and following vehicle 11 is absent whereas virtual visual point 20 is set to a higher position in other cases. The former is a control with emphasis on suppressing the gaze guidance, and the latter is a control with emphasis on facilitating the backward monitoring, and either may be adopted depending on the design concept of the vehicle.

Example 3-3

Tilt Control for Projection Plane 10 in Accordance with Movement of Virtual Visual Point 20

Figure 19:
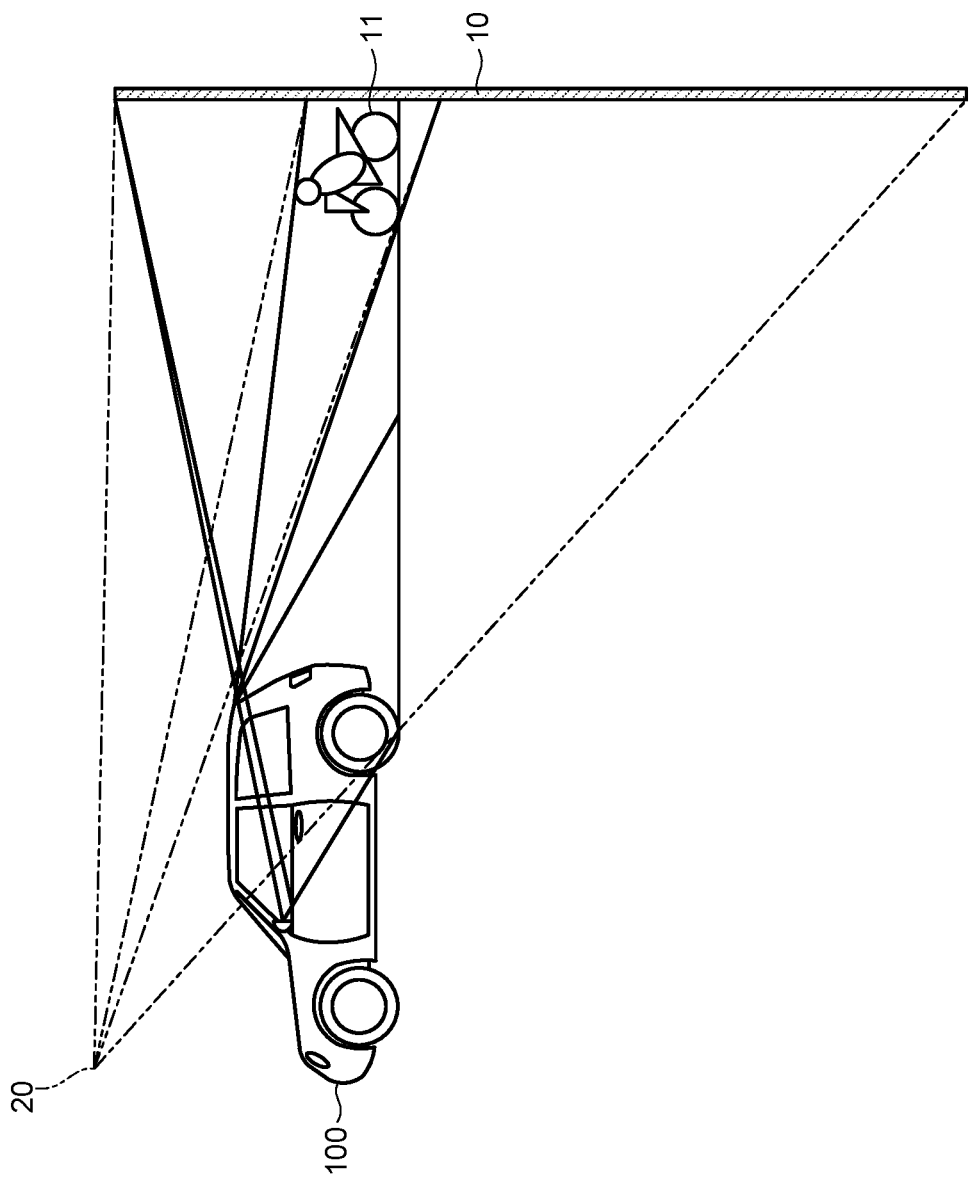
FIG. 19 is a diagram for describing a control method for a tilt of projection plane 10.
Figure 20:
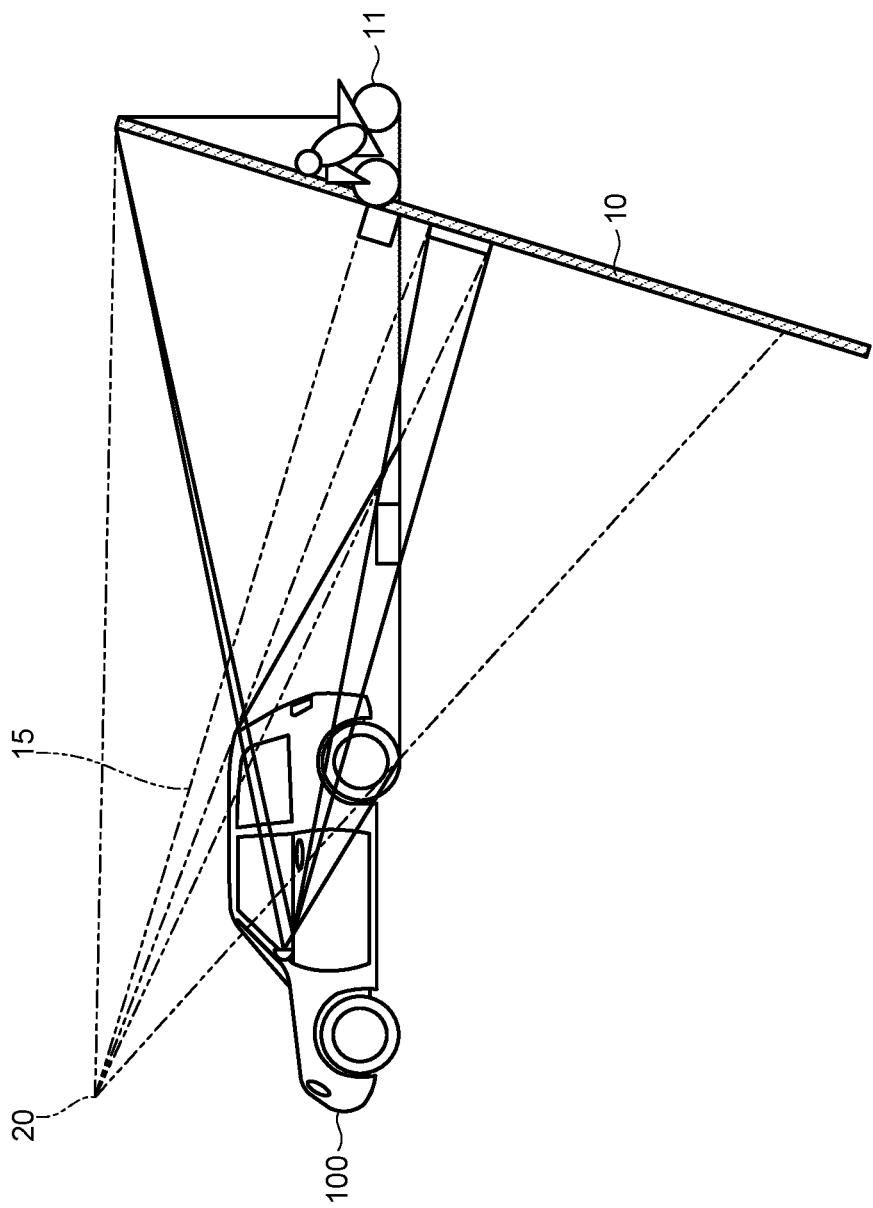
FIG. 20 is another diagram for describing a control method for a tilt of projection plane 10.

FIGS. 19 and 20 are diagrams each for describing a control method for a tilt of projection plane 10.

As illustrated in FIG. 19, in a case where projection plane 10 extends vertically up and down relative to the road surface, an image of part of following vehicle 11 near the road surface is projected onto projection plane 10 below the road surface. When this image on projection plane 10 is viewed from virtual visual point 20 set to a position higher than the actual camera position, the image of following vehicle 11 appears vertically deformed (distorted).

Therefore, as illustrated in FIG. 20, when setting virtual visual point 20 to a higher position by using the control of Example 3-1 or Example 3-2, display control apparatus 200 sets projection plane 10 at a position where following vehicle 11 is assumed present and tilts projection plane 10 as inclined with respect to the road surface. At this time, display control apparatus 200 sets projection plane 10 such that it is perpendicular to virtual gaze 15 extending from virtual visual point 20 to a position where following vehicle 11 is assumed present.

Note that the distance from vehicle 100 to projection plane 10 may be appropriately changed according to the speed of vehicle 100 and may be increased when, for example, vehicle 100 is traveling at a high speed. It is reasonable to change the distance from vehicle 100 to projection plane 10 according to the vehicle speed because atypical vehicle-to-vehicle distance is long under the high vehicle speed and short under the low vehicle speed.

When an image which looks down the vehicle from a higher position is provided for the purpose of making it easier to grasp the movement of the subject-vehicle and following vehicle 11 on the road surface, the distortion of the image of following vehicle 11 can be eliminated by tilting projection plane 10 as inclined with respect to the road surface.

Further, when setting virtual visual point 20 to a lower position by using the control of Example 3-1 or Example 3-2, display control apparatus 200 may set projection plane 10 at a position where following vehicle 11 is assumed and set projection plane 10 as being perpendicular to the road surface.

Setting projection plane 10 as being perpendicular to the road surface reduces a movement of the road surface on display 7, thereby preventing unnecessary gaze drawing.

Thus, display control apparatus 200 changes a tilt angle of projection plane 10 depending on the presence or absence of following vehicle 11 or in accordance with a speed of the subject-vehicle, thereby making it possible to reduce the distortion of an image projected onto the projection plane while making a gaze of the driver to be less likely guided thereto.

Example 3-4

Control of Including Road Surface in Projection Plane 10

Figure 21:
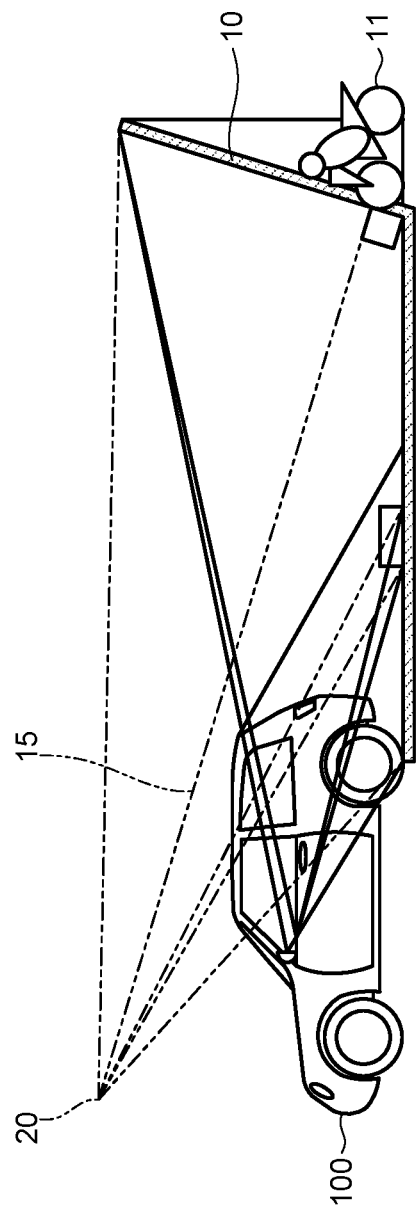
FIG. 21 is a diagram for describing a control method for including a road surface in projection plane 10.

FIG. 21 is a diagram for describing a control method for including a road surface in projection plane 10.

As illustrated in FIG. 21, display control apparatus 200 may be configured to include the road surface in projection plane 10.

When the road surface is included in projection plane 10, a position of a road marking (e.g., speed limit display on road surface) remains unchanged and independent from the projection, which can eliminate distortion (deformation) due to the projection. Further, the road marking becomes easier to see by viewing projection plane 10 including the road surface from virtual visual point 20 set to a higher position.

Further, display control apparatus 200 may be configured such that when the ground height of virtual visual point 20 is increased, the image of the road surface is included in projection plane 10 whereas when the ground height of virtual visual point 20 is lowered, a range of the road surface included in projection plane 10 is made smaller than a range of the road surface included in projection plane 10 when increasing the ground height of virtual visual point 20.

Incidentally, in a case where following vehicle 11 is absent and virtual visual point 20 is set to a lower position, a display image as actually viewed by the driver can be obtained even when an image is projected onto projection plane 10 not including the road surface; accordingly, the road surface need not be added to projection plane 10 in this case.

Example 3-5

Control for Adding Gentle Slope 18 to Lower Portion of Projection Plane 10

Figure 22:
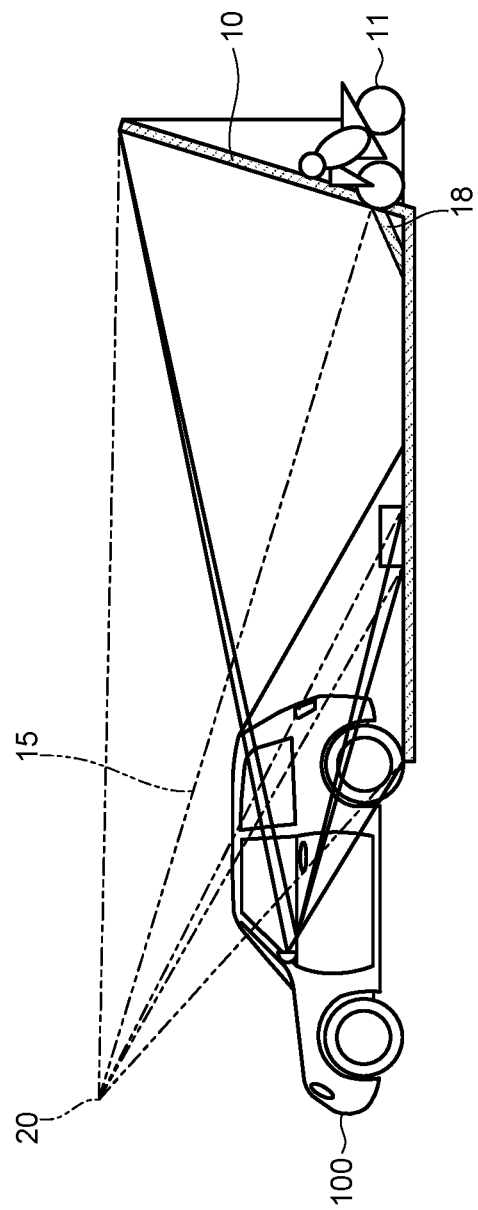
FIG. 22 is a diagram for describing a control method for adding gentle slope 18 to a lower portion of projection plane 10.

FIG. 22 is a diagram for describing a control method for adding gentle slope 18 to a lower portion of projection plane 10.

Display control apparatus 200 may be configured to add gentle slope 18 between projection plane 10 and the road surface and set the entirety of projection plane 10 and gentle slope 18 as a projection plane.

A tilt of gentle slope 18 with respect to the road surface is smaller than the tilt of projection plane 10 with respect to the road surface. Although FIG. 22 illustrates a case where gentle slope 18 is planar, gentle slope 18 is not limited to this and may be a curved surface smoothly connecting between projection plane 10 and the road surface.

When an image of a road surface farther than projection plane 10 is projected onto projection plane 10 that is tilted to rise against the road surface, the image is distorted and difficult to see. As a result, the image of the road surface before projection plane 10 and the image of the road surface farther than projection plane 10 become discontinuous, which increases the sense of incongruity of the appearance.

Adding gentle slope 18 between projection plane 10 and the road surface reduces the discontinuity between the road surface and projection plane 10, and thus, the distortion of the image of the road surface farther than projection plane 10 can be reduced.

Example 3-6

Control for Setting Position of Gentle Slope 18 so as not to Obstruct Visibility of Following Vehicle 11

Depending on a position where gentle slope 18 is provided, the visibility of following vehicle 11 may be obstructed. For example, in a case where following vehicle 11 is present in the vicinity of projection plane 10, in the figure of following vehicle 11, a portion projected onto gentle slope 18 is distorted, and a straight line spanning the portion projected onto gentle slope 18 and a portion projected onto the above projection plane appears to be bent. As a measure against this, it is conceivable to limit a height of an upper end of gentle slope 18 to a range within which a substructure of an assumed following vehicle. An example of the substructure of the following vehicle includes a portion below a bumper of a four-wheeled vehicle or a portion below an axle of a motorcycle.

Then, the portion to be distorted is limited to the lower portion of the image of following vehicle 11. When the driver visually recognizes the following vehicle, the portion to be focused is an upper portion of a vehicle body, and thus, even when the lower portion of the image of following vehicle 11 is distorted, there is little obstacle in visually recognizing following vehicle 11.

Accordingly, display control apparatus 200 may set the upper end of gentle slope 18 to a position of the bumper or axle of following vehicle 11 at a position where following vehicle 11 is assumed present, so that gentle slope 18 is connected to projection plane 10.

Thus, the bent portion of projection plane 10 (gentle slope 18) is set to the lower portion of following vehicle 11, and the image of an upper portion of following vehicle 11 is no longer discontinuous, thereby improving the visibility of following vehicle 11.

In addition, in overhead displaying, for the purpose of providing continuity with the case where following vehicle 11 is detected, the road surface may be included in projection plane 10 even when following vehicle 11 is not detected. However, since a reduction in the gaze guidance is required, a stimulus to the gaze may be reduced, when the road surface is included in projection plane 10, by narrowing the range of the road surface included in projection plane 10 or blurring a road surface portion.

Example 4

Display control apparatus 200 may be configured to re-project an image of following vehicle 11 that has been projected onto screen projection plane 13A onto projection plane 10, and, when re-projecting the image of following vehicle 11, enlarge the image of following vehicle 11 projected onto screen projection plane 13A, depending on the distance from screen projection plane 13A to projection plane 10.

By way of example, suppose that a four-wheeled vehicle is present just beside following vehicle 11 illustrated in FIG. 12 and the distance from this four-wheeled vehicle to the subject-vehicle is equal to the distance from following vehicle 11 to the subject-vehicle. Moreover, assuming that the height of the four-wheeled vehicle is approximately the same as that of following vehicle 11, but the width of the four-wheeled vehicle is larger than the width of following vehicle 11.

Here, screen projection plane 13A is set to a minimum size that allows an entire image of following vehicle 11 to be projected, and thus, the four-wheeled vehicle exceeding the size of screen projection plane 13A is not subject to the setting of screen projection plane 13A.

Therefore, the following problem may arise in a case where screen projection plane 13A is not set in front of the four-wheeled vehicle, but screen projection plane 13A is set only in front of following vehicle 11. That is, the distance from screen projection plane 13A to an object projected onto screen projection plane 13A (e.g., following vehicle 11) is different from the distance from projection plane 10 set farther than screen projection plane 13A to an object projected onto projection plane 10 (e.g., four-wheeled vehicle mentioned above). Accordingly, an enlargement rate for the object of the screen image projected onto screen projection plane 13A is different from an enlargement rate for the object of the background image projected onto projection plane 10.

In other words, following vehicle 11 is projected onto screen projection plane 13A set immediately in front of following vehicle 11, so that the size of the image thereof is reduced to fall within the dimension of screen projection plane 13A, whereas the four-wheeled vehicle present just beside following vehicle 11 is projected onto projection plane 11 in a distant place, so that the image thereof is enlarged and increased.

Hence, putting the screen image onto the background image makes it possible that the enlarged image of the four-wheeled vehicle is aligned next to the reduced image of following vehicle 11 as mentioned above when generating one display image. Thus, the driver may feel sense of incongruity in the generated image or may mistakenly recognize that following vehicle 11 is positioned farther than the four-wheeled vehicle present just beside following vehicle 11.

Incidentally, an enlargement rate of an image including an object (e.g., four-wheel vehicle described above) to be projected onto projection plane 11 as a background image is determined by the ratio of the distance from vehicle 100 to the object to the distance from vehicle 100 to projection plane 11. Therefore, when following vehicle 11 approaches vehicle 100, a difference in enlargement rate between the two increases, and thus, the sense of incongruity due to a difference in size of images between the two becomes remarkable.

To solve such a problem, display control apparatus 200 re-projects an image of following vehicle 11 that has been projected onto screen projection plane 13A onto projection plane 10, and, when re-projecting the image of following vehicle 11, enlarges the image of following vehicle 11 projected onto screen projection plane 13A, depending on the distance from screen projection plane 13A to projection plane 10.

With this configuration, the enlargement rate of the image including the object (e.g., four-wheel vehicle described above) to be projected onto projection plane 11 as the background image can be substantially the same as the enlargement rate of the image including the object (e.g., following vehicle 11) to be projected onto screen projection plane 13A as the screen image.

Note that, a surface for the re-projection is not limited to projection plane 10, and, for example, display control apparatus 200 may set a projection plane different from projection plane 10, at a position away from screen projection plane 13A by substantially the same distance as that from screen projection plane 13A to projection plane 10, and re-project the screen image onto the projection plane.

Meanwhile, instead of re-projecting a screen image that has been projected onto screen projection plane 13A onto projection plane 10, display control apparatus 200 may be configured to project the screen image as follows. For example, display control apparatus 200 first calculates the distance from following vehicle 11 to screen projection plane 13A and the distance from the following vehicle to projection plane 10, and then calculates the ratio of these distances. Next, display control apparatus 200 zooms the screen image by setting the calculated ratio to an enlargement rate of the screen image, and then puts this screen image onto the background image to generate a combined image. In the manner described above, it is no longer necessary to re-project, onto the projection plane, the screen image obtained by projecting following vehicle 11 onto screen projection plane 13A.

Incidentally, display control apparatus 200 can calculate the distance from following vehicle 11 to screen projection plane 13A and the distance from following vehicle 11 to projection plane 10, based on sensing information detected by a distance sensor such as a sonar (obstacle sensor), for example. Since this sensing information provides the distance from vehicle 100 to following vehicle 11, display control apparatus 200 can calculate the distance from following vehicle 11 to screen projection plane 13A and the distance from following vehicle to projection plane 10, based on these pieces of information and the known information that is previously set (distance from vehicle 100 to screen projection plane 13A and distance from vehicle 100 to projection plane 10). Display control apparatus 200 may calculate the distance information based on a sensing device other than a sonar (e.g., millimeter wave radar or camera).

Meanwhile, when re-projecting the screen image or generating the combined image by zooming the screen image as described above, display control apparatus 200 may highlight the image including following vehicle 11. In particular, when generating the combined image by zooming the screen image, display control apparatus 200 can make the image of following vehicle 11 conspicuous by increasing a zoom rate or changing the rate.

This allows the driver to visually recognize that following vehicle 11 is approaching vehicle 100.

Incidentally, as a method of highlighting the image including following vehicle 11, any method is conceivable such as a method of displaying following vehicle 11 while surrounding by a line, a method of blinking the image including following vehicle 11, and the like. Further, the driver may be separately notified that following vehicle 11 is approaching vehicle 100 by voice or vibration, in addition to highlighting the image including following vehicle 11.

The highlighting of the image including following vehicle 11 may be applied when the distance between following vehicle 11 and vehicle 100 is less than a predetermined distance or when the distance between following vehicle 11 and vehicle 100 is rapidly decreasing (i.e., following vehicle 11 is rapidly approaching vehicle 100).

(Effects of Present Disclosure)

The effects of the present disclosure will be described below in comparison with the conventional art.

Example 1

In one example, Japanese Unexamined Patent Application Publication (Translation of PCT Application) No. 2014-531078 discloses a method in which, when a raised object in the surroundings of the vehicle is detected, a plane of projection near the raised object is transformed so that the plane of projection is raised over the width of the raised object.

In the technique of Japanese Unexamined Patent Application Publication (Translation of PCT Application) No. 2014-531078, when a particular portion of the plane of projection is greatly transformed, a tilt of the plane of projection is increased around the transformed portion, which causes large deformation of the image to be projected, distortion of the shape, and difficulty in visual recognition. Example 2 described above is a scheme in which an image of an approaching following vehicle is projected onto screen projection plane 13A, an image of the background is projected onto another independent and distant projection plane, and a display image is finally obtained by combining images on the two projection planes; thus, according to this, the figure of the following vehicle as well as the image of the background are not distorted, and the visual recognition is not obstructed by distortion. This effect of no distortion and unobstructed visual recognition is similarly obtained in a boundary region that is to be double-imaged by blending and that is to be set at an edge portion of screen projection plane 13A. That is, there is no part where distortion is generated due to the deformation of the projection plane and is difficult to visually recognize.

Example 2

Human beings each has vision capable of separating and individually recognizing objects that are double-imaged, such as an exhibit in an exhibition case and his/her own face reflected in the exhibition case.

Example 2 described above is a scheme that positively utilizes the capability of the human vision and solves the problem of disappearance of the figure of the following vehicle at a joint of the visual fields of the two camera images, by performing the blending to put the figure of the following vehicle onto the double-imaged boundary region. For example, putting the face of the driver of the following motorcycle into the boundary region subject to the blending makes it possible to visually recognize the image of the face as long as it is not deformed even when the driver's face is blended with the background, and it can be expected that an orientation of the face is also determined.

In the scheme of Japanese Unexamined Patent Application Publication (Translation of PCT Application) No. 2014-531078, for example, when a portion of the face is greatly deformed, it cannot be expected to identify being a face and to determine an orientation of the face. That is, a visual function of human being assists recognition in a case of double-imaging, but the visual function cannot be operated in a case of deformation and the recognition is thus obstructed; accordingly, the scheme of the present application has a more excellent effect.

Example 2-4

For example, the vehicle surrounding image generation apparatus disclosed in Japanese Patent Application Laid Open No. 2019-185381 moves the range subject to weighted addition averaging to the side of the other overhead view image when a movement direction of a stereoscopic object is a direction approaching one of the overhead view images, whereas moves the range subject to weighted addition averaging to the side of one of the overhead view images when a movement direction of the stereoscopic object is a direction approaching the other overhead view image. However, the distribution of weights in the range subject to weighted addition averaging is constant regardless of the stereoscopic object. Therefore, depending on the control for the range subject to weighted addition averaging, an important portion for controlling the movement of vehicle 100, e.g., the facial portion of the driver of following vehicle is located at an end of the range subject to weighted addition averaging, and the weight of the portion becomes small, which causes the thinly displaying of the portion on the display image, and it may be difficult to be visually recognized.

By contrast, in Example 2 described above, a center position of the figure of following vehicle 11 or, when following vehicle 11 is a motorcycle, a position of the driver's face (or head) of the motorcycle is detected, and the control is performed the blend ratio between an image on the right side and an image on the left side relative to a boundary region is one to one at the center position of the figure or the position of the face. This reduces the risk of overlooking because the figure of following vehicle 11 or the driver's face is displayed with approximately half the density, as well as it is easy to predict the next movement in a case where the blend ratio is controlled based on the position of the driver's face.

Figure 23:
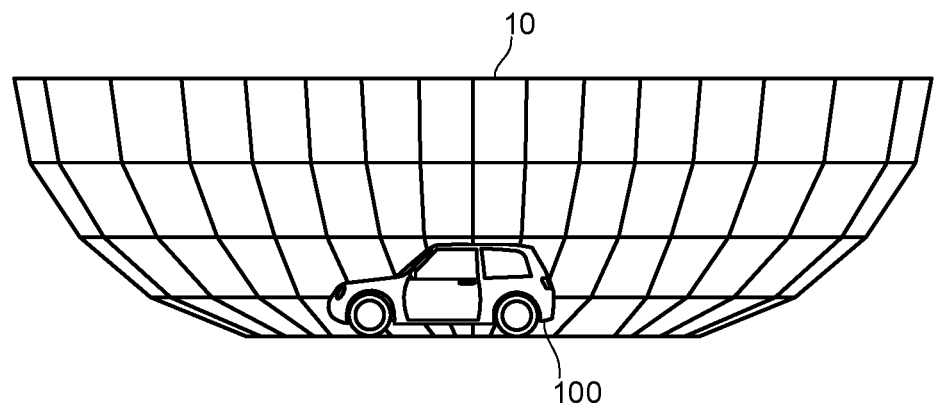
FIG. 23 illustrates projection plane 10 which has a bowl-like shape.
Figure 24:
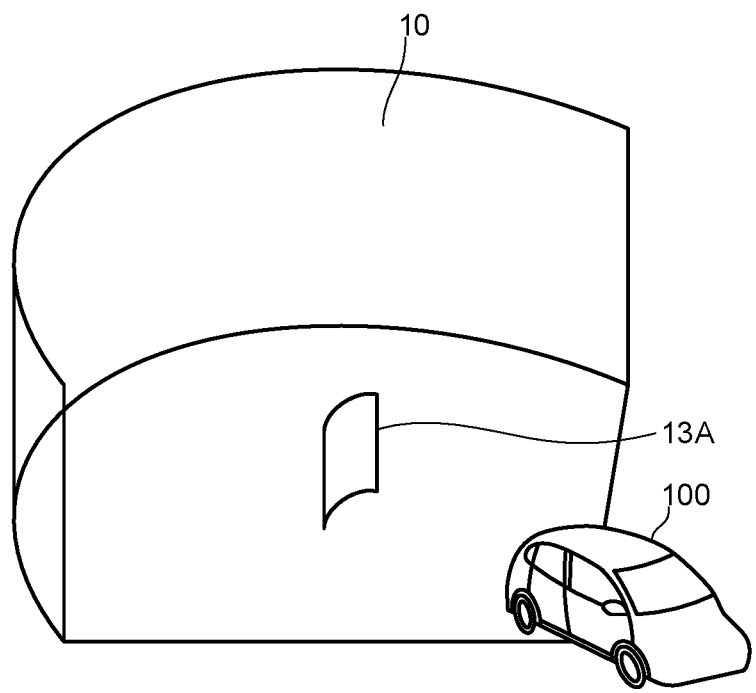
FIG. 24 illustrates examples of projection plane 10 and screen projection plane 13A each of which has a curved cylindrical shape.

FIG. 23 illustrates projection plane 10 which has bowl-like shape. FIG. 24 illustrates examples of projection plane 10 and screen projection plane 13A each of which has a curved cylindrical shape. Using projection plane 10 or screen projection plane 13A each having such a shape, the distance from vehicle 100 to projection plane 10 or screen projection plane 13A becomes constant at any position behind vehicle 100, thereby reducing the distortion of an image of following vehicle 11 and the like.

Note that, for example, the following aspects are also understood to fall within the scope of the present disclosure.

1. A display control apparatus includes: a vehicle detector that detects a surrounding vehicle present around a vehicle, based on a plurality of captured images around the vehicle captured by a plurality of imaging devices mounted to the vehicle; and an image processor that generates a display image to be displayed on a display mounted to the vehicle, by combining the plurality of captured images, in which the image processor generates a background image of the vehicle by projecting the plurality of captured images onto a first projection plane set behind the vehicle, sets, when the surrounding vehicle is detected in a predetermined region, a second projection plane to a position at which the surrounding vehicle is detected, generates a surrounding vehicle image that is an image of the surrounding vehicle, by projecting at least one of the plurality of captured images onto the second projection plane, and superimposes the surrounding vehicle image on the background image.

2. The image processor generates, in a boundary portion between the surrounding vehicle image and the background image, the display image by blending a pixel value of the surrounding vehicle image and a pixel value of the background image.

3. The surrounding vehicle image includes a boundary region for blending pixel values of the plurality of captured images, and the image processor changes a cross point at which a mix ratio in blending the pixel values in the boundary region is one to one, depending on a position of the surrounding vehicle or a position of a face or a head of a driver of the surrounding vehicle.

4. The predetermined region is set with reference to a region that is not displayed on the background image when a range for projection from the plurality of captured images around the vehicle is limited to make the background image a continuous image in a case of projecting the plurality of captured images around the vehicle onto the first projection plane set behind the vehicle.

5. The image processor the processor performs a visual point conversion process for converting at least one of the plurality of captured images around the vehicle into an image as viewed from a virtual visual point different from a position of a corresponding one of the plurality of imaging devices, the vehicle detector detects the presence or absence of a surrounding vehicle in a predetermined region that is set with the vehicle as a reference position, and the image processor sets a ground height of the virtual visual point when the surrounding vehicle is not detected in the predetermined region to be lower than a ground height of the virtual visual point when the surrounding vehicle is detected in the predetermined region.

6. The image processor sets, in a case where a traveling speed of the vehicle is equal to or less than a predetermined value, a ground height of the virtual visual point to be higher than a ground height of a case where the traveling speed of the vehicle exceeds the predetermined value.

7. A tilt of the first projection plane with respect to a road surface when the ground height of the virtual visual point is lowered is larger than a tilt of the first projection plane with respect to the road surface when the ground height of the virtual visual point is increased.

8. The image processor includes a road surface in the first projection plane when increasing the ground height of the virtual visual point and includes no road surface in the first projection plane when lowering the ground height of the virtual visual point.

9. The image processor includes a road surface in the first projection plane when increasing the ground height of the virtual visual point, and the processor makes, when lowering the ground height of the virtual visual point, a range of the road surface that is included in the first projection plane smaller than a range of the road surface that is included in the first projection plane when increasing the ground height of the virtual visual point.

10. In the first projection plane with a position corresponding to a predetermined ground height as a reference point, an angle formed between a straight line connecting between the reference point and the virtual visual point and a straight line perpendicular to the first projection plane passing through the reference point is equal to or less than a predetermined value.

11. A tilt of a projection plane with respect to a road surface in a portion below the reference point in the first projection plane is smaller than a tilt of a projection plane with respect to the road surface in a portion above the reference point in the first projection plane.

12. A vehicle includes the above-described display control apparatus.

13. A display control method includes: detecting a surrounding vehicle present around a vehicle, based on a plurality of captured images around the vehicle captured by a plurality of imaging devices mounted to the vehicle; generating a background image of the vehicle by projecting the plurality of captured images onto a first projection plane set behind the vehicle; setting, when the surrounding vehicle is detected in a predetermined region, a second projection plane to a position at which the surrounding vehicle is detected; generating a surrounding vehicle image that is an image of the surrounding vehicle, by projecting at least one of the plurality of captured images onto the second projection plane; and superimposing the surrounding vehicle image on the background image.

The specific examples of the present disclosure have been described in detail above, but these specific examples are mere examples and do not limit the appended claims. The technology described in the appended claims embraces various modifications and changes made in accordance with the specific examples described above.

This application is entitled and claims the benefit of Japanese Patent Application No. 2020-145674, filed on Aug. 31, 2020, the disclosure of which including the specification, drawings and abstract is incorporated herein by reference in its entirety.

INDUSTRIAL APPLICABILITY

An exemplary embodiment of the present disclosure is suitable for a display control apparatus and a vehicle.

The invention claimed is:
1. A display control apparatus, comprising:
a vehicle detector that detects a surrounding vehicle present around a vehicle, based on a plurality of captured images around the vehicle captured by a plurality of imaging devices mounted to the vehicle; and
a processor that generates a display image to be displayed on a display mounted to the vehicle, by combining the plurality of captured images,
wherein the processor generates a background image of the vehicle by projecting the plurality of captured images onto a first projection plane set behind the vehicle, sets, when the surrounding vehicle is detected in a predetermined region, a second projection plane to a position at which the surrounding vehicle is detected, generates a surrounding vehicle image of the surrounding vehicle, by projecting at least one of the plurality of captured images onto the second projection plane, and superimposes the surrounding vehicle image on the background image, the surrounding vehicle image includes a boundary region for blending pixel values of the plurality of captured images, and the processor changes a cross point at which a mix ratio in blending the pixel values in the boundary region is one to one, depending on a position of the surrounding vehicle or a position of a face or a head of a driver of the surrounding vehicle.

2. The display control apparatus according to claim 1, wherein the processor generates, in a boundary portion between the surrounding vehicle image and the background image, the display image by blending a pixel value of the surrounding vehicle image and a pixel value of the background image.

3. The display control apparatus according to claim 2, wherein the predetermined region is set with reference to a region that is not displayed on the background image when a range for projection from the plurality of captured images around the vehicle is limited to make the background image a continuous image in a case of projecting the plurality of captured images around the vehicle onto the first projection plane set behind the vehicle.

4. The display control apparatus according to claim 2, wherein the processor performs a visual point conversion process for converting at least one of the plurality of captured images around the vehicle into an image as viewed from a virtual visual point different from a position of a corresponding one of the plurality of imaging devices, the vehicle detector detects a presence or an absence of the surrounding vehicle in the predetermined region that is set with the vehicle as a reference position, and the processor sets a ground height of the virtual visual point when the surrounding vehicle is not detected in the predetermined region to be lower than a ground height of the virtual visual point when the surrounding vehicle is detected in the predetermined region.

5. The display control apparatus according to claim 4, wherein the processor sets, in a case where a traveling speed of the vehicle is equal to or less than a predetermined value, the ground height of the virtual visual point to be higher than the ground height in a case where the traveling speed of the vehicle exceeds the predetermined value.

6. A vehicle comprising the display control apparatus according to claim 1.

7. The display control apparatus according to claim 1, wherein the predetermined region is set with reference to a region that is not displayed on the background image when a range for projection from the plurality of captured images around the vehicle is limited to make the background image a continuous image in a case of projecting the plurality of captured images around the vehicle onto the first projection plane set behind the vehicle.

8. The display control apparatus according to claim 1, wherein the processor performs a visual point conversion process for converting at least one of the plurality of captured images around the vehicle into an image as viewed from a virtual visual point different from a position of a corresponding one of the plurality of imaging devices, the vehicle detector detects a presence or an absence of the surrounding vehicle in the predetermined region that is set with the vehicle as a reference position, and the processor sets a ground height of the virtual visual point when the surrounding vehicle is not detected in the predetermined region to be lower than a ground height of the virtual visual point when the surrounding vehicle is detected in the predetermined region.

9. A display control apparatus, comprising:

a vehicle detector that detects a surrounding vehicle present around a vehicle, based on a plurality of captured images around the vehicle captured by a plurality of imaging devices mounted to the vehicle; and a processor that generates a display image to be displayed on a display mounted to the vehicle, by combining the plurality of captured images, wherein the processor generates a background image of the vehicle by projecting the plurality of captured images onto a first projection plane set behind the vehicle, sets, when the surrounding vehicle is detected in a predetermined region, a second projection plane to a position at which the surrounding vehicle is detected, generates a surrounding vehicle image of the surrounding vehicle, by projecting at least one of the plurality of captured images onto the second projection plane, and superimposes the surrounding vehicle image on the background image, and wherein the predetermined region is set with reference to a region that is not displayed on the background image when a range for projection from the plurality of captured images around the vehicle is limited to make the background image a continuous image in a case of projecting the plurality of captured images around the vehicle onto the first projection plane set behind the vehicle.

10. The display control apparatus according to claim 9, wherein the processor performs a visual point conversion process for converting at least one of the plurality of captured images around the vehicle into an image as viewed from a virtual visual point different from a position of a corresponding one of the plurality of imaging devices, the vehicle detector detects a presence or an absence of the surrounding vehicle in the predetermined region that is set with the vehicle as a reference position, and the processor sets a ground height of the virtual visual point when the surrounding vehicle is not detected in the predetermined region to be lower than a ground height of the virtual visual point when the surrounding vehicle is detected in the predetermined region.

11. A display control apparatus, comprising:

a vehicle detector that detects a surrounding vehicle present around a vehicle, based on a plurality of captured images around the vehicle captured by a plurality of imaging devices mounted to the vehicle; and a processor that generates a display image to be displayed on a display mounted to the vehicle, by combining the plurality of captured images, wherein the processor
- generates a background image of the vehicle by projecting the plurality of captured images onto a first projection plane set behind the vehicle,
- sets, when the surrounding vehicle is detected in a predetermined region, a second projection plane to a position at which the surrounding vehicle is detected,
- generates a surrounding vehicle image of the surrounding vehicle, by projecting at least one of the plurality of captured images onto the second projection plane, and
- superimposes the surrounding vehicle image on the background image, and wherein
- the processor performs a visual point conversion process for converting at least one of the plurality of captured images around the vehicle into an image as viewed from a virtual visual point different from a position of a corresponding one of the plurality of imaging devices,
- the vehicle detector detects a presence or an absence of the surrounding vehicle in the predetermined region that is set with the vehicle as a reference position, and
- the processor sets a ground height of the virtual visual point when the surrounding vehicle is not detected in the predetermined region to be lower than a ground height of the virtual visual point when the surrounding vehicle is detected in the predetermined region.

12. The display control apparatus according to claim 11, wherein the processor sets, in a case where a traveling speed of the vehicle is equal to or less than a predetermined value, the ground height of the virtual visual point to be higher than the ground height in a case where the traveling speed of the vehicle exceeds the predetermined value.

13. The display control apparatus according to claim 11, wherein a tilt of the first projection plane with respect to a road surface when the ground height of the virtual visual point is lowered is larger than a tilt of the first projection plane with respect to the road surface when the ground height of the virtual visual point is increased.

14. The display control apparatus according to claim 11, wherein the processor includes a road surface in the first projection plane when increasing the ground height of the virtual visual point and includes no road surface in the first projection plane when lowering the ground height of the virtual visual point.

15. The display control apparatus according to claim 11, wherein the processor includes a road surface in the first projection plane when increasing the ground height of the virtual visual point, and the processor makes, when lowering the ground height of the virtual visual point, a range of the road surface that is included in the first projection plane smaller than a range of the road surface that is included in the first projection plane when increasing the ground height of the virtual visual point.

16. The display control apparatus according to claim 11, wherein, in the first projection plane with a position corresponding to a predetermined ground height as a reference point, an angle formed between a straight line connecting between the reference point and the virtual visual point and a straight line perpendicular to the first projection plane passing through the reference point is equal to or less than a predetermined value.

17. The display control apparatus according to claim 16, wherein a tilt of a projection plane with respect to a road surface in a portion below the reference point in the first projection plane is smaller than a tilt of a projection plane with respect to the road surface in a portion above the reference point in the first projection plane.

18. A display control method, comprising:
- detecting a surrounding vehicle present around a vehicle, based on a plurality of captured images around the vehicle captured by a plurality of imaging devices mounted to the vehicle;
- generating a background image of the vehicle by projecting the plurality of captured images onto a first projection plane set behind the vehicle;
- setting, when the surrounding vehicle is detected in a predetermined region, a second projection plane to a position at which the surrounding vehicle is detected;
- generating a surrounding vehicle image of the surrounding vehicle, by projecting at least one of the plurality of captured images onto the second projection plane; and
- superimposing the surrounding vehicle image on the background image, wherein the surrounding vehicle image includes a boundary region for blending pixel values of the plurality of captured images, and the display control method changes a cross point at which a mix ratio in blending the pixel values in the boundary region is one to one, depending on a position of the surrounding vehicle or a position of a face or a head of a driver of the surrounding vehicle.

* * * * *